US010721187B1

United States Patent
Goldman et al.

(10) Patent No.: US 10,721,187 B1
(45) Date of Patent: Jul. 21, 2020

(54) EMULATING OUTPUT QUEUED BEHAVIOR IN A VIRTUAL OUTPUT QUEUE SWITCH

(71) Applicant: Juniper Networks, Inc., Sunnyvale, CA (US)

(72) Inventors: Gary Goldman, Los Altos, CA (US); Sarin Thomas, Sunnyvale, CA (US); Jean-Marc Frailong, Los Altos Hills, CA (US); Harshad B Agashe, Pune (IN)

(73) Assignee: Juniper Networks, Inc., Sunnyvale, CA (US)

( * ) Notice: Subject to any disclaimer, the term of this patent is extended or adjusted under 35 U.S.C. 154(b) by 393 days.

(21) Appl. No.: 15/599,394

(22) Filed: May 18, 2017

(51) Int. Cl.
*H04L 12/933* (2013.01)
*H04L 12/935* (2013.01)
*H04L 12/873* (2013.01)
*H04L 12/863* (2013.01)
*H04L 12/931* (2013.01)
*H04L 12/861* (2013.01)

(52) U.S. Cl.
CPC ........ *H04L 49/3027* (2013.01); *H04L 49/206* (2013.01); *H04L 49/9057* (2013.01)

(58) Field of Classification Search
CPC .................................................. H04L 49/3027
See application file for complete search history.

(56) References Cited

U.S. PATENT DOCUMENTS

| | | | | |
|---|---|---|---|---|
| 6,246,690 | B1* | 6/2001 | DiPlacido | H04Q 11/0478 370/408 |
| 6,976,154 | B1 | 12/2005 | Dyckerhoff et al. | |
| 7,505,422 | B1* | 3/2009 | Park | H04L 45/7453 370/256 |
| 7,715,316 | B2* | 5/2010 | Jones | H04L 47/20 370/232 |
| 8,767,752 | B1* | 7/2014 | Tripathi | H04L 47/11 370/401 |
| 8,797,877 | B1* | 8/2014 | Perla | H04L 49/90 370/230 |
| 10,298,495 | B2* | 5/2019 | Tang | H04L 47/522 |
| 2003/0084246 | A1* | 5/2003 | Tran | H04L 49/3027 711/122 |
| 2004/0131069 | A1* | 7/2004 | Ling | H04L 47/621 370/417 |
| 2008/0279195 | A1* | 11/2008 | Okuno | H04L 49/1523 370/395.6 |

(Continued)

*Primary Examiner* — Rasheed Gidado
(74) *Attorney, Agent, or Firm* — Shumaker & Sieffert, P.A.

(57) ABSTRACT

A system and method for routing network packets. A switch fabric connects a plurality of forwarding units, including an egress forwarding unit and two or more ingress forwarding units, each ingress forwarding unit forwarding network packets to the egress forwarding unit via the switch fabric. The egress forwarding unit includes a scheduler and an output queue. Each ingress forwarding unit includes a Virtual Output Queue (VOQ) connected to the output queue and a VOQ manager. The scheduler receives time of arrival information for network packets stored in the VOQs, determines, based on the time of arrival information for each network packet, a device resident time for the network packets stored in the VOQs, and requests, from one of the VOQs and based on the device resident times, the network packet with the longest device resident time.

27 Claims, 10 Drawing Sheets

(56) References Cited

U.S. PATENT DOCUMENTS

| | | | |
|---|---|---|---|
| 2009/0245104 A1* | 10/2009 | Nishimura | H04L 47/10 370/230 |
| 2011/0235509 A1* | 9/2011 | Szymanski | H04L 47/14 370/230 |
| 2012/0106564 A1* | 5/2012 | Chen | H04L 49/101 370/401 |
| 2014/0161135 A1* | 6/2014 | Acharya | H04L 47/263 370/412 |

* cited by examiner

EMULATING OUTPUT QUEUED BEHAVIOR IN A VIRTUAL OUTPUT QUEUE SWITCH

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of forwarding units (referred to in some examples as packet forwarding engines (PFEs)) and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes several forwarding structures generated by the control unit in accordance with the routing information and control information. The control unit installs the forwarding structures within the data plane to programmatically configure the forwarding components. The data and instructions that constitute the forwarding structures define an internal forwarding path for each incoming packet received by the network device. For example, to generate a route table lookup forwarding structure, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the PFEs to update the FIB within each of the PFEs and control traffic forwarding within the data plane.

In some examples, Virtual Output Queues (VOQs) are used to prevent Head-of-Line blocking at output interfaces. Head-of-Line blocking may occur when a line of packets is delayed because a previously queued packet cannot be forwarded to an output destination.

VOQs may be used in switches to emulate the operation of Output Queued (OQ) switches. A VOQ architecture buffers the packets received by the network device in VOQs in each ingress PFE. In one example, each VOQ in an ingress PFE forwards packets to a specific egress PFE. Each VOQ, therefore, serves as a logical queue corresponding to an output queue at the egress PFE, presenting a single buffering point, which acts as a buffer that covers both the fabric congestion point and the outgoing network port congestion point.

SUMMARY

The techniques described herein are directed to managing VOQs so that they perform in combination in a manner that emulates the behavior of an ideal OQ switch.

In one example approach, in a device that includes a plurality of ingress forwarding units connected through a switch fabric to a plurality of egress forwarding units, including a first egress forwarding unit, each egress forwarding unit including a scheduler and an output queue, and each ingress forwarding unit including a plurality of virtual output queues (VOQs), each VOQ associated with one output queue, a method includes receiving, at the scheduler of the first egress forwarding unit, time of arrival information associated with each packet group of one or more network packets that is to be forwarded to the first egress forwarding unit, the time of arrival information indicating a time of arrival at one of the plurality of ingress forwarding units for the associated packet group, determining, at the scheduler of the first egress forwarding unit and based on the time of arrival information associated with each packet group, a device resident time for each packet group stored in the VOQs associated with the first egress forwarding unit, requesting, from one of the VOQs and based on the device resident times, the packet group with the longest device resident time; and receiving, at the output queue of the first egress forwarding unit, the packet group with the longest device resident time.

In another example approach, a computer-readable storage medium includes instructions for causing one or more programmable processors to receive time of arrival information associated with one or more network packets to be forwarded from virtual output queues (VOQs) of one or more ingress forwarding units, the VOQs associated with a first egress forwarding unit, the time of arrival information corresponding to an approximate time of arrival of the network packet at the ingress forwarding unit of the VOQ in which the network packet is stored, determine, based on the time of arrival information, a device resident time for one or more of the network packets stored in the VOQs associated with the first egress forwarding unit, request, from one of the VOQs associated with the first egress forwarding unit and based on the device resident times, the network packet with the longest device resident time, and receive, at the output queue of the egress PFE of the first egress forwarding unit, the network packet with the longest device resident time.

In another example approach, in a device having ingress packet forwarding engines (PFEs) and egress PFEs, wherein each ingress PFE includes a virtual output queue (VOQ) associated with an output buffer of the egress PFE, a method including determining, at a scheduler of the egress PFE, a device resident time for each network packet stored in one of the VOQs associated with the output buffer of the egress PFE, wherein determining includes receiving, from each ingress PFE, information related to time of arrival, at the ingress PFE, of network packets stored in the VOQ of the ingress PFE, determining a longest device resident time from the device resident times of the network packets, if the longest device resident time is less than a maximum device resident time, requesting, at the scheduler of the egress PFE, that the network packet with the longest device resident time be transmitted from the VOQ in which the network packet is stored to the output buffer of the egress PFE, and, otherwise, dropping one or more network packets.

In another example approach, a computer-readable storage medium includes instructions for causing one or more programmable processors to determine a device resident time for each network packet stored in one of the virtual output queues (VOQs) associated with the output queue of the egress forwarding unit, wherein determining includes receiving, from each ingress forwarding unit, information related to time of arrival, at the ingress forwarding unit, of network packets stored in the VOQ of the ingress forwarding unit, determine a longest device resident time from the device resident times of the network packets stored in the VOQs, if the longest device resident time is less than a maximum device resident time, request, at a scheduler of the egress forwarding unit, that the network packet with the longest device resident time be transmitted from the VOQ in which the network packet is stored to the output buffer of the egress forwarding unit and, otherwise, drop one or more network packets.

In another example approach, a network device includes a switch fabric and a plurality of forwarding units, each forwarding unit connected to the switch fabric, wherein two or more ingress ones of the forwarding units forward network packets to an egress one of the forwarding units via the switch fabric, the egress forwarding unit including a scheduler and an output queue attached to a network interface, each ingress forwarding unit including a Virtual Output Queue (VOQ) connected to the output queue and a VOQ manager for the VOQ, each VOQ comprising a logical queue associated with the output queue of the egress forwarding unit, each VOQ manager determining when to drop network packets stored in its VOQ. The scheduler receives time of arrival information for network packets stored in the VOQs, determines, based on the time of arrival information for each network packet, a device resident time for the network packets stored in the VOQs, and requests, from one of the VOQs and based on the device resident times, the network packet with the longest device resident time.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
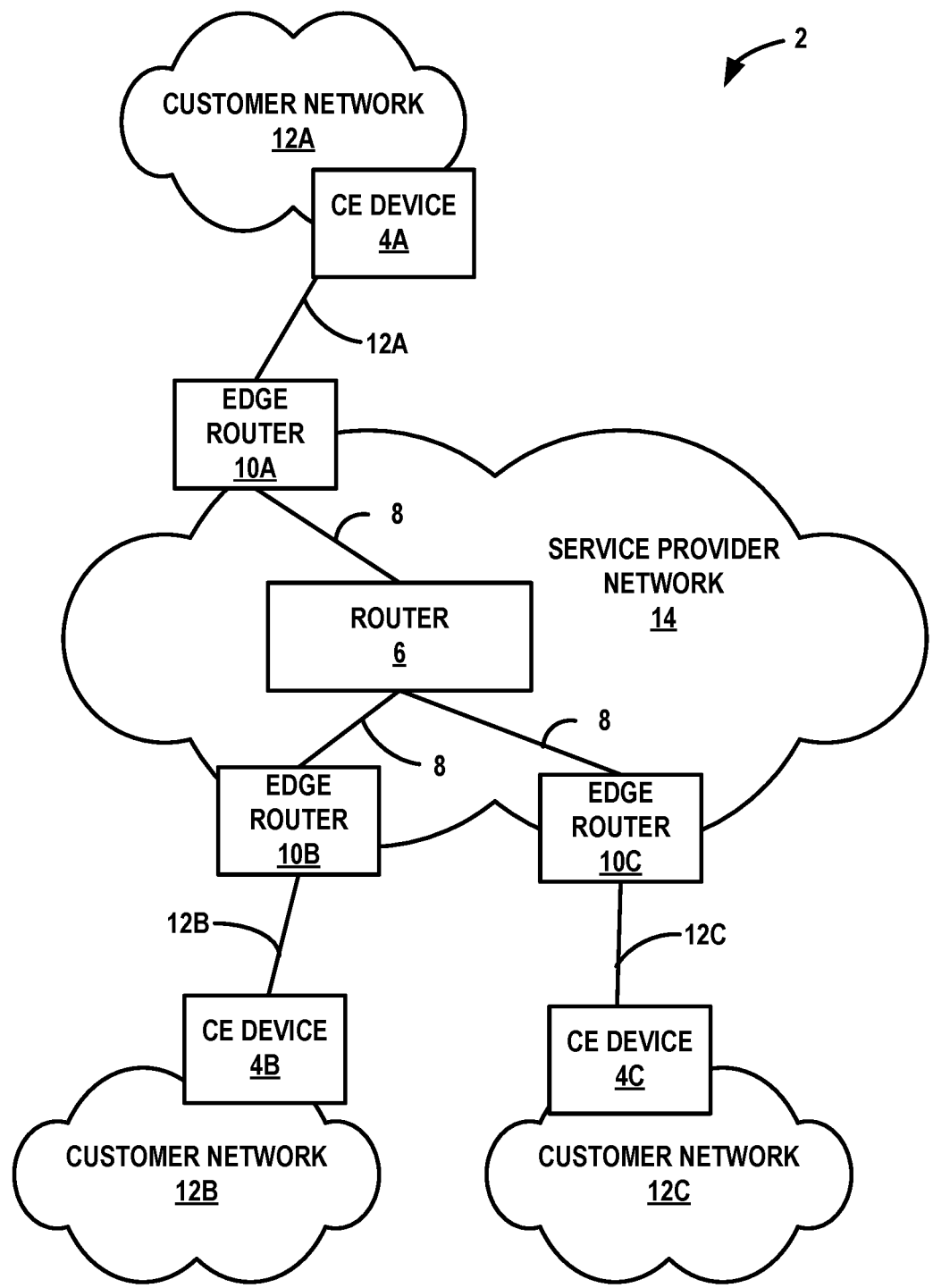
FIG. 1 is a block diagram illustrating an example system in which a VOQ-based router emulates the behavior of an OQ switch when forwarding packets from VOQs in the ingress forwarding units of the router to an egress PFE associated with the VOQs, in accordance with the techniques described herein.

An Output Queued (OQ) switch provides optimal throughput under all traffic scenarios and may provide QoS guarantees. In an ideal OQ switch, the only congestion point is at the outgoing network ports; packets are buffered at the egress PFE OQs facing the outgoing network ports immediately after arrival on ingress ports. An ideal Output Queued switch, however, requires a fabric with a total bandwidth that scales with $N^2$, where N is the port bandwidth. Such a fabric is cost prohibitive to build in switches, especially as the number of ports increase. At the same time, customers desire switches that act like OQ switches.

As noted above, virtual output queue (VOQ) architecture takes a different approach. Instead of separate physical buffers for input and output queues, the switch uses the physical buffers on the ingress pipeline of each Packet Forwarding Engine (PFE) chip to store traffic for every egress port. Every output queue on an egress port has buffer storage space on every ingress pipeline on the PFE chips on the switch. The mapping of ingress pipeline storage space to output queues is 1-to-1, so each output queue receives buffer space on each ingress pipeline.

Furthermore, instead of one input queue containing traffic destined for multiple different output queues (a one-to-many mapping), each output queue has a dedicated VOQ comprised of the input buffers on each packet forwarding engine that are dedicated to that output queue (a 1-to-1 mapping). That is, the input buffers of each ingress PFE are organized into VOQs with one VOQ dedicated to each OQ associated with every output port on an egress PFE. This architecture prevents communication between any two ports from affecting another port.

Finally, instead of storing traffic on a physical output queue until it can be forwarded, a VOQ does not transmit traffic from the ingress buffer across the fabric to the egress port until the egress port has the resources to forward the traffic. In effect, each VOQ in a VOQ-based switch represents the ingress buffering for an output queue. The VOQ, therefore, serves as a logical queue corresponding to an output queue at a corresponding egress PFE. Each VOQ switch has a single buffering point that is at the ingress PFE; this acts as a buffer that covers both the fabric congestion point and the outgoing network port congestion point. If the VOQs are treated as an extension of the OQs (which are egress network ports facing), then every packet that arrives in a system can instantaneously be buffered at its destination OQ without the need for traversing over a fabric with $N^2$ speedup. It is possible, therefore, to emulate the behavior of an ideal OQ switch by judicious handling of the packets stored in each VOQ.

In one example approach, a unique buffer ID identifies each output queue on a PFE chip. Each of the six PFE chips uses the same unique buffer ID for a particular output queue. The traffic stored using a particular buffer ID represents the traffic destined for one particular output queue on one port, and is the VOQ for that output queue.

Each OQ switch exhibits two behaviors: packet admission and packet departure order. With regard to packet admission, packets arriving into the OQ switch (on any ingress port) and destined towards an Output Queue (OQ) should be admitted into the Output Queue based on the current OQ occupancy level (i.e., the OQ occupancy based admission or drop determination should be based on the occupancy level of the current OQ). In an ideal OQ switch, the packets arriving on any of the input ports of the switch should immediately be taken to the output queue on which it should depart and should be dropped only based on the occupancy level of the output queue. There are no other drop points in the ideal OQ switch.

For packet departure order, packets arriving into an ideal OQ switch and admitted into an Output Queue (OQ) should leave the OQ in the order of arrival (OQ FIFO order departure). In an ideal OQ switch, the packets arriving on any of the input ports of the switch, if admitted into the output queue (i.e., when not dropped), should depart the output queue in the order of arrival into the output queue (which is same as the order of arrival into the switch).

An issue with the use of VOQs to emulate the behavior of an ideal OQ switch is burst absorption. The issue raised with OQ burst absorption can be described as follows: when there is an egress OQ in the switch which has an offered load which is equal to the service rate of the OQ (the offered load may be slightly less than the capacity or service rate of the OQ such that there is no oversubscription/congestion) and, while the OQ is in this state, a burst is offered to the OQ from one or more ingress PFEs, oversubscribing the OQ for a period such that the buffer allocated for the OQ is filled up, the ideal OQ switch will handle the burst without loss. That is, the burst is a controlled burst such that the buffer allocated for an OQ will not overflow.

For an ideal OQ switch there should be zero packet loss in this scenario. For a VOQ switch, when only one PFE is sourcing traffic to the OQ buffer, one can ensure zero packet loss when emulating an ideal OQ switch. On the other hand, when the OQ buffer is distributed and lives in more than one PFE, multiple ingress PFEs are sourcing traffic to this OQ. The challenge in the VOQ architecture is that, to emulate an ideal OQ switch when the buffer is distributed across two or more VOQs, one must ensure that the sum of the buffers spread across the different ingress PFEs stays equal to the total buffer size configured for the OQ.

FIG. 1 is a block diagram illustrating an example system in which a VOQ-based router emulates the behavior of an OQ switch when forwarding packets from VOQs in the ingress forwarding units of the router to an egress PFE associated with the VOQs, in accordance with the techniques described herein. In the example of FIG. 1, system 2 includes a router 6 and edge routers 10A-10C ("edge routers 10"). Router 6 emulates the behavior of an OQ switch when forwarding packets received at the ingress forwarding units of the router to associated egress forwarding units of router 6. In one example approach, one or more of the edge routers 10 emulate the behavior of an OQ switch when forwarding packets received at the ingress forwarding units of that edge router 10 to associated egress forwarding units of that edge router 10.

In the example shown in FIG. 1, edge routers 10A-10C ("edge routers 10") provide customer edge (CE) devices 4A-4C ("CE devices 4") associated with customer networks 12A-12C ("customer networks 12") with access to a service provider network 14. In the illustrated embodiment, edge router 10A is coupled to CE device 4A via access link 12A, edge router 10B is coupled to CE device 4B via access link 12B, and edge router 10C is coupled to CE device 4C via access link 12C. CE devices 4 may be, for example, routers, switches or other network devices. Customer networks 12 may be, for example, networks for geographically separated sites of an enterprise. Each of customer networks 12 may include one or more additional computing devices (not shown), such as, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 12. Nonetheless, for ease of description, only customer networks 12A-12C are illustrated in FIG. 1.

In accordance with the techniques described herein, one or more of router 6, edge routers 10, and CE devices 4 are configured to route network packets in accordance with forwarding information generated by the respective devices. For example, each of edge routers 10 and router 6 may include one or more packet forwarding engines (PFEs) (also referred to as "forwarding units") configured to switch packets from an input interface to an output interface of the router using a switch fabric internal to the router. When router 6, for example, receives packets, the ingress PFE performs a lookup using forwarding information and forwards the network packet across an internal switch fabric of router 6 to an egress PFE the router. In some examples, router 6 may include multiple ingress PFEs that each route network packets to a corresponding egress PFE of router 6. Consequently, network packets from multiple ingress PFEs may "fan in" to a single egress PFE of router 6.

Although not illustrated, service provider network 14 may be coupled to one or more networks administered by other providers, and may thus form part of a large-scale public network infrastructure, e.g., the Internet. Consequently, customer networks 12 may be viewed as edge networks of the Internet. Service provider network 14 may provide computing devices within customer networks 12 with access to the Internet, and may allow the computing devices within the customer networks to communicate with each other. Service provider network 14 may include a variety of network devices other than edge routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of links 8 and/or 12, such that the network elements of system 2 are not directly coupled.

Router 6 or edge routers 10 may be multi-chassis routers that include multiple routing nodes (not shown in FIG. 1) that are physically coupled and configured to operate as a single routing node. That is, to peer routers of network environment 2, router 6 or edge routers 10 each appear as a single routing device. For example, although edge router 10A includes a plurality of routing nodes, from the perspective of peer router 10B, the multi-chassis edge router 10A has a single network address and maintains single peer routing sessions for each routing protocol maintaining peer routing sessions with each of the edge routers 10.

As previously described, router 6 may include multiple PFEs. In some examples, the multiple PFEs may be configured as ingress PFEs, egress PFEs, or both, for various packet flows. Ingress PFEs for a packet flow receive network packets from other network devices such as edge routers 10 and route the network packets to an egress PFE for the packet flow based on forwarding information. In some examples, ingress PFEs include one or more network interfaces to receive the network packets via links 8. The ingress PFEs forward network packets to egress PFEs of router 6 using a switch fabric that operatively interconnects ingress and egress PFEs in router 6.

Egress PFEs receive network packets from ingress PFEs via a switch fabric and route the network packets to other network devices, such as edge routers 10. In some examples, the egress PFEs include one or more network interfaces to route the network packets to edge routers 10 via links 8. Because a single egress PFE of router 6 can receive network packets from multiple ingress PFEs, the network packets may be buffered to reduce and/or eliminate packet dropping due to congestion at the egress PFE.

In accordance with techniques of the disclosure, each ingress PFE of router 6 may include one or more VOQs for each egress interface to which the ingress PFE forwards packets. Each VOQ is a logical queue that represents a corresponding output queue of the respective egress PFE. In some examples, VOQs and corresponding output queues for each egress interface may be assigned to priority levels to enable quality of service (QoS)/class of service (CoS) guarantees for router 6. For example, an egress interface of an egress PFE of router 6 may have eight outputs queues corresponding to eight different network traffic priority levels. Each ingress PFE of router 6, therefore, may have a corresponding eight VOQs for the eight output queues of the egress interface. As network packets are received by an ingress PFE, the network packets are stored in VOQs for the corresponding egress interfaces of the egress PFEs until, for example, an ingress PFE receives a message from the egress PFE that a network packet may be forwarded to the egress interface. This may reduce an amount of storage required by an egress PFE to buffer packets from multiple ingress PFEs and may avoid packet "double-buffering," whereby a packet is deeply queued once in its ingress PFE and again in its egress PFE. In some examples, the egress PFE uses one or more scheduling techniques to divide the bandwidth across the ingress PFEs when requesting network packets.

Example techniques of the disclosure map a logical buffer space of an output queue for a given egress PFE across all the ingress PFEs that send network packets to the egress PFE. That is, the logical size of the buffer space for an output queue on an egress interface is divided across all the ingress PFEs that route network packets to the egress PFE. Stated another way, the collective size of the buffer spaces for all VOQs that correspond to the output queue may be equal to the logical size of the output queue on an egress interface.

Because each ingress PFE includes VOQs for the respective output queues of egress PFEs, in some example approaches, each ingress PFE rather than each egress PFE determines whether to drop network packets. In other example approaches, each egress PFE instructs its corresponding ingress PFEs when to drop network packets stored in the VOQs. Consequently, the output queue of an egress interface may include only a shallow buffer, such as a buffer that stores a quantity of network data equal to the amount of network data that may be transmitted in the roundtrip latency of the switch fabric.

In some example approaches, ingress PFEs dynamically modify the buffer sizes of respective VOQs based on the rate (e.g., "drain rate") at which network packets are dequeued from the respective VOQs and forwarded to the egress PFE. More specifically, the buffer size of a given VOQ at an ingress interface may be directly proportional to the rate at which network packets are forwarded to the egress PFE by an ingress PFE. In some example approaches, ingress PFEs dynamically modify the buffer sizes to maintain one or more throughput requirements, such as a target switch fabric link utilization rate (e.g., 95-100% utilization. Approaches for sizing VOQ buffer sizes when emulating an OQ switch are described in VIRTUAL OUTPUT QUEUE ALLOCATION USING DYNAMIC DRAIN BANDWIDTH, U.S. patent application Ser. No. 13/570,419, filed Aug. 9, 2012, the description of which is incorporated herein by reference.

Although discussed for purposes of example primarily with respect to routers, the techniques of this disclosure may be implemented by other network devices as well. For example, switches may implement the techniques of this disclosure in some examples to improve Layer Two (L2) (that is, Data Link Layer) functionality of the switches. In some examples, the techniques of this disclosure may be implemented by Ethernet switches. Although the techniques of this disclosure are described for purposes of example with respect to service provider network 14 and customer networks 12, the techniques may be similarly applied in devices associated with other contexts, such as non-edge routers and non-edge customer devices as well as L2, L3, and L2/L3 switches, among other devices, within service provider network 14 and customer networks 12.

Figure 2:
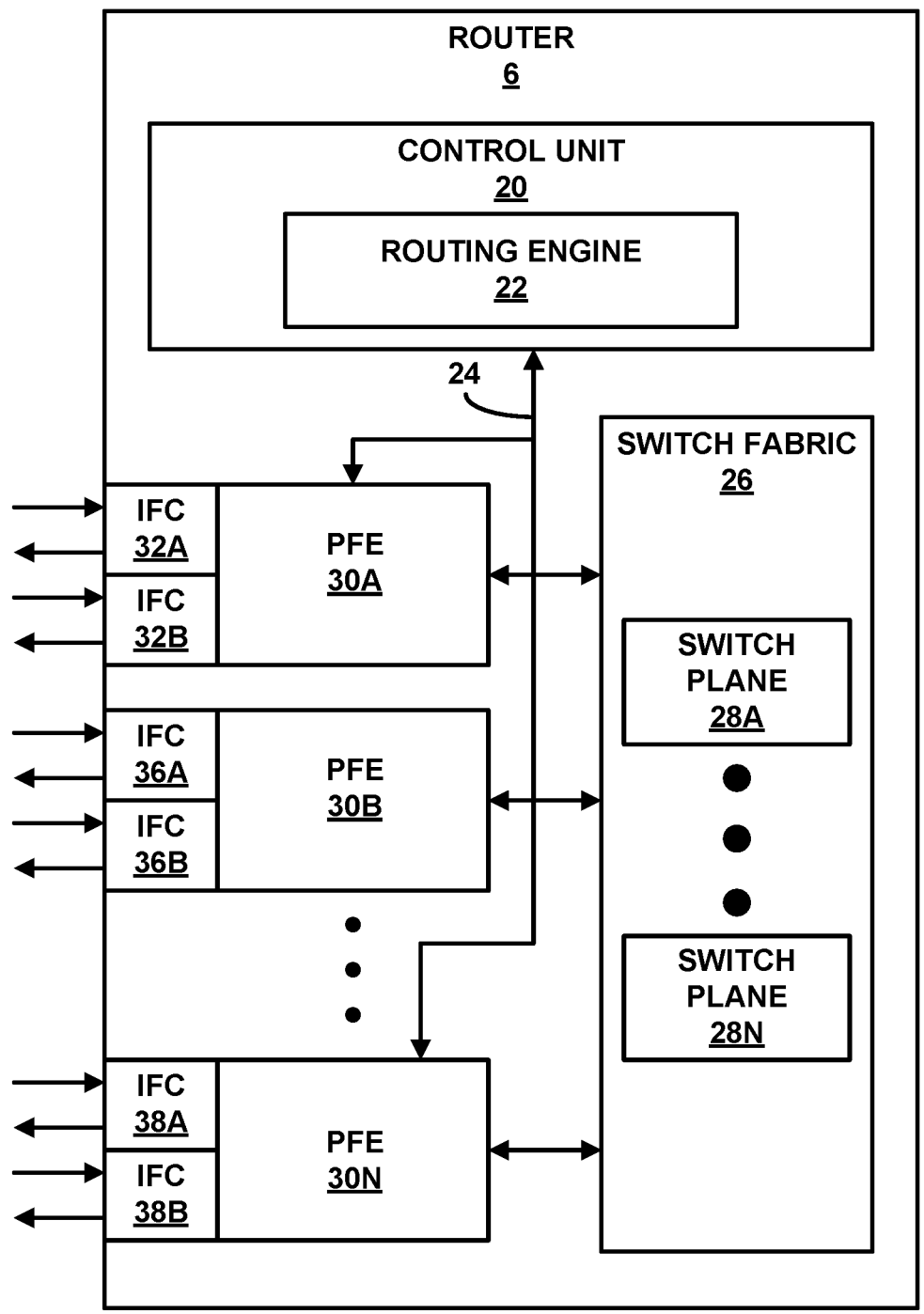
FIG. 2 is a block diagram illustrating the example router of FIG. 1 in greater detail.

FIG. 2 is a block diagram illustrating example router 6 of FIG. 1 in greater detail. Router 6 includes switch fabric 26 and PFEs 30A-30N ("PFEs 30"), each capable of implementing techniques of the disclosure. In this example, router 6 also includes a control unit 20 that includes a routing engine 22. PFEs 30 may receive and send data via interface cards 32A-32B, 36A-36B, and 38A-38B ("IFCs 32", "IFCs 36", and "IFCs 38", respectively). In other embodiments, each of PFEs 30 may comprise more or fewer IFCs. Switch fabric 26 provides an interconnect mechanism for forwarding data between PFEs 30 for transmission over a network, e.g., the Internet.

Routing engine 22 maintains routing tables, executes routing protocol and controls user access to router 6. In this example, routing engine 22 is connected to each of PFEs 30 by a dedicated link 24, which may be an internal Ethernet link. For example, dedicated link 24 may comprise a 100 Mbps Ethernet connection. Routing engine 22 maintains routing information that describes a topology of a network, and derives a forwarding information base (FIB) in accordance with the routing information. In one example approach, routing engine 22 copies the FIB to each of PFEs 30. This allows the FIB in each of PFEs 30 to be updated without degrading packet forwarding performance of router 6. Alternatively, routing engine 22 may derive separate FIBs that are copied to respective PFEs 30.

In a routing node, a "switch plane" is generally capable of providing a communication path between any two of PFEs 30. In this example, switch fabric 26 consists of multiple standalone switch planes 28A through 28N ("switch planes 28"). In some embodiments, switch fabric chips provide each of the switch planes 28 on one or more separate, removable switch cards. Other routing nodes that implement the techniques described herein may comprise additional or fewer switch planes, including a single switch plane. Many switch planes may be active at any given time with data packets distributed over the active switch planes. The inactive switch plane(s) of switch fabric 26 serves as back-up switch plane(s) such that if one or more of the active switch planes goes offline, the back-up switch plane(s) automatically activate, and the bandwidth capacity of standalone router 10 is not diminished. The back-up switch plane(s) may be identical to the active switch planes and may act as hot spare(s) to maintain bandwidth capacity if one or more of the active switch planes fail. Each of switch planes 28 is operationally independent; therefore, standalone router 6 may continue to forward packets as long as at least one of switch planes 28 remain active, but possibly at a reduced bandwidth capacity.

As part of a standalone router, switch planes 28 form a standalone switch fabric 26. That is, each of switch planes 28 can provide a connection between any of PFEs 30 within router 6. In this manner, switch planes 30 form a standalone switch fabric 26 that enables packet forwarding between the plurality of PFEs 30 of router 6. For example, switch fabric 26 may be provided by a set of removable switch cards, where each removable switch card provides a respective one of switch planes 28.

As shown in FIG. 2, PFE 30A and PFE 30B may be ingress PFEs that receive network packets at one or more of interfaces 32A-32B and 36A-36B, respectively. Ingress PFEs 30A and 30B may route the network packets to PFE 30N, which may be acting as an egress PFE for PFEs 30A and 30B. Consequently, egress PFE 30N may route network packets to other network devices via one or more of network interfaces 38A-38B.

Because network packets fan in to egress PFE 30N from ingress PFEs 30A and 30B, each of ingress PFEs 30A and 30B may buffer network packets, in accordance with techniques of the disclosure, to reduce and/or eliminate packet dropping. As described in the discussion of FIG. 1, ingress PFEs 30A and 30B may each include a VOQ that corresponds to the output queue of egress PFE 30N. Each VOQ may be implemented using on-chip memory of an ingress PFE and/or off-chip memory (e.g., Dynamic Random-Access Memory (DRAM)) of the ingress PFE. For instance, ingress PFE 30A may include on-chip memory and off-chip memory. To store a network packet in a VOQ, ingress PFE 30A may store the network packet in the off-chip memory and a pointer to the network packet in the on-chip memory. In one example approach, the quantity of off-chip memory allocated to the VOQ represents the portion of the logical buffer space of the output queue that is allocated to the corresponding VOQ of PFE 30A.

In one example, interface 38A ("egress interface 38A") may be an egress interface of PFE 30N. The port rate of egress interface 38A may be, for example, 10 Gigabits/second (Gbps) and the packet buffer memory allocated in the ingress PFE for the OQ may have a bandwidth-delay product of 50 ms. Ingress PFE 30A may therefore determine a logical output queue size of 500 megabits (Mb) (i.e., 10 Gbps×50 ms=500 Mb). Ingress PFE 30B may also, in the same way, determine that the logical output queue size is 500 Mb. Ingress PFEs 30A, 30B may, therefor, set the initial sizes of their respective VOQs to the logical size of the corresponding output queue.

Although each of ingress PFEs 30A and 30B determines the total logical buffer size of the output queue to be 500 Mb (in this example) and set their initial VOQ size to the same value, in some example approaches, each of ingress PFEs 30A and 30B thereafter dynamically determines buffer sizes for their respective VOQs that collectively sum to a number greater than or equal to the total logical buffer size of the output queue. In some such example approaches, ingress PFEs 30A and 30B determine the buffers sizes of the respective VOQs based on the drain rate at which network packets are forwarded from the ingress PFEs to egress PFE 30N. Consequently, the buffer size of the VOQ for ingress PFE 30A may be a function of the rate at which ingress PFE 30A dequeues network packets from the VOQ to egress PFE 30N.

If, for example, ingress PFE 30A determines, from the example above and based on its drain rate, that ingress PFE 30A is the only ingress PFE forwarding network packets to egress PFE 30N, ingress PFE 30A may expand the buffer space of its VOQ to equal the total 500 Mb logical buffer size of the output queue. If, however, PFE 30B begins forwarding network packets to egress PFE 30N as well, ingress PFE 30A, in accordance with the techniques of the disclosure determines a change in the rate at which ingress PFE 30A can forward network packets to egress interface 30N and may reduce its maximum buffer size accordingly.

In one example approach, ingress interface 32A may receive an incoming data packet via a packet-based network link, such as an Ethernet link. A lookup module (not shown) within ingress PFE 30A determines a destination address, multicast forwarding tuple, or other keying information of the packet from the packet data and queries a forwarding information base (FIB) for a forwarding entry matching the keying information. A matching entry specifies the appropriate next hop interface for the packet. The next hop interface for the packet may be egress interface 38A of PFE 30N.

Network packets stored in the VOQ of ingress PFE 30A are queued and wait for scheduling to be switched across switch fabric 26 to the appropriate one or more egress PFEs 20. Ingress packets remain in the VOQ on the ingress port input queues until the output queue is ready to accept and forward more traffic. In an example approach, to transport packets across the switch fabric to egress ports:

1. The ingress line card PFE request scheduler sends a request (REQ) to the egress line card PFE grant scheduler to notify the egress PFE that data is available for transmission.

2. When there is space in the output buffer, the egress line card grant scheduler responds by sending a bandwidth grant (GNT) to the ingress line card PFE.

3. The ingress line card PFE receives the grant from the egress line card PFE, and transmits the data to the egress line card.

Under most conditions, the switch fabric is fast enough to be transparent to egress class-of-service (CoS) policies, so the process of forwarding traffic from the ingress pipeline, across the switch fabric, to egress ports, does not affect the configured CoS policies for the traffic. The fabric only affects CoS policy if there is a fabric failure or if there is an issue of port fairness.

In some example approaches, when a packet ingresses and egresses the same PFE chip (local switching), the packet does not traverse the switch fabric. However, the switch uses the same request and grant mechanism to receive egress bandwidth as packets that cross the fabric, so locally switched packets and packets that arrive at a PFE chip after crossing the switch fabric are treated fairly when the traffic is contending for the same output queue.

In the example above, egress PFE 30N, using a scheduler technique, receives a request from ingress PFE 30A to dequeue a network packet, and egress PFE 30N responds with a grant message to ingress PFE 30A. In response to receiving the grant message, ingress PFE 30A dequeues a network packet from the VOQ and sends the network packet to egress PFE 30N. When egress PFE 30N receives the network packet, egress PFE 30N may forward the network packet to another network device using egress interface 38B.

Control unit 20 may be implemented solely in software, or hardware, or may be implemented as combinations of software, hardware, or firmware. For example, control unit 20 may include one or more processors that execute software instructions. For example, control unit 20 may comprise a processor, such as one or more programmable processors, microprocessors, application specific integrated circuits, field programmable gate arrays, digital signal processors, or other equivalent integrated or discrete logic circuitry. Control unit 20 may comprise one or more processors that execute software instructions, such as those used to define a software or computer program, stored to a computer-readable storage medium, such as a storage device (e.g., a disk drive, or an optical drive), or memory (e.g., a Flash memory, random access memory, or RAM) or any other type of volatile or non-volatile memory that stores instructions (e.g., in the form of a computer program or other executable) to cause a programmable processor to perform the techniques described herein.

Alternatively, control unit 20 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), one or more Digital Signal Processors (DSPs) or any combination of the foregoing examples of dedicated hardware, for performing the techniques described herein.

Figure 3:
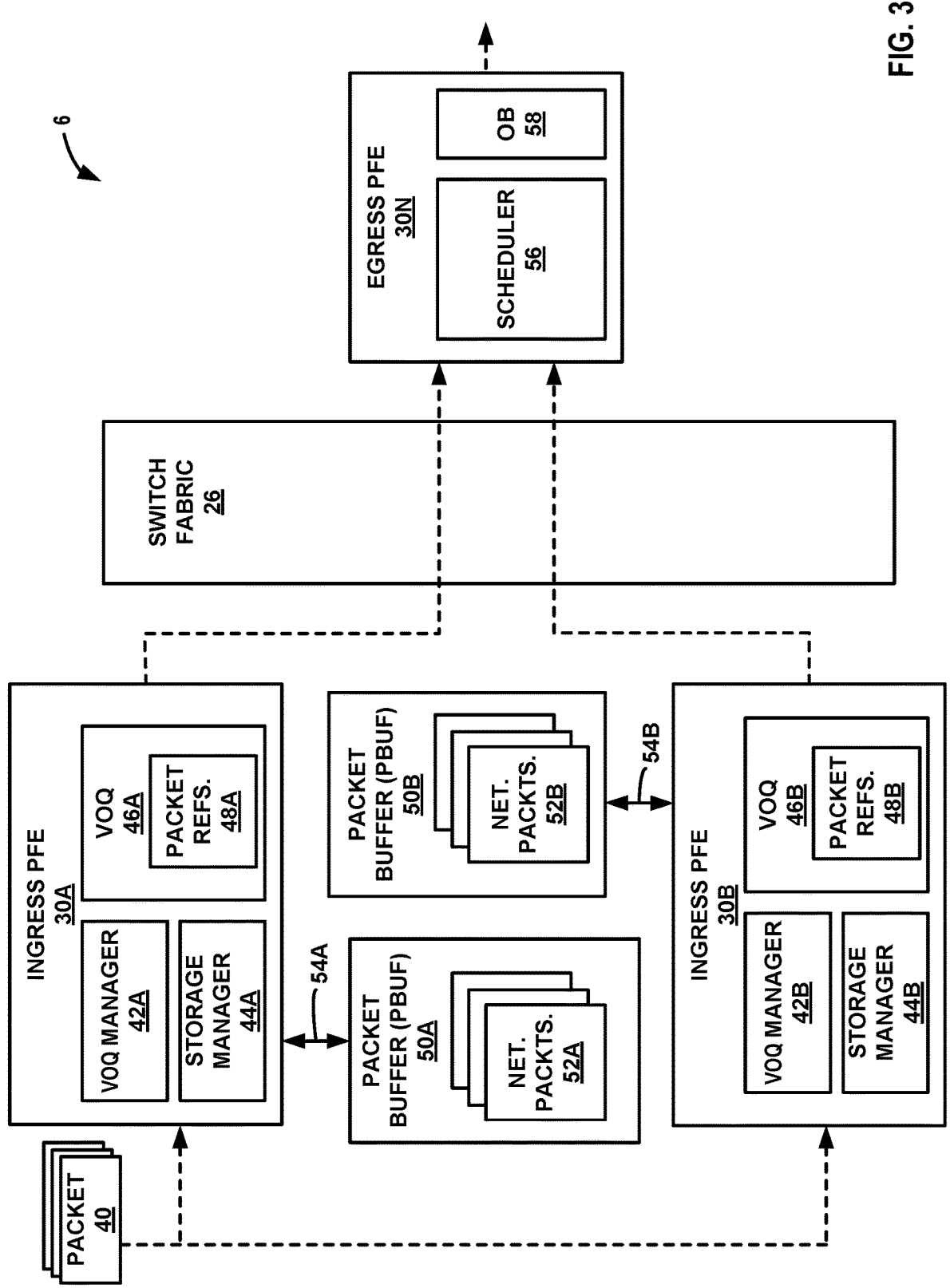
FIG. 3 is a block diagram illustrating in further detail ingress forwarding units of an example router operating in accordance with techniques of the present disclosure.

FIG. 3 is a block diagram illustrating in further detail ingress forwarding units of an example router operating in accordance with techniques of the present disclosure. FIG. 3 illustrates a router 6 having ingress PFEs 30A, 30B and egress PFE 30N, in accordance with techniques of the present disclosure. FIG. 3 includes ingress PFE 30A, ingress PFE 30B, egress PFE 30N, and switch fabric 26 as shown in FIG. 2. FIG. 3 also includes a packet buffer memory (PBUF) 50A and a PBUF 50B, which in some example approaches, store network packet data 52 A and network packet data 52B, respectively, in off-chip memory such as DRAM and, in other example approaches, store packet data 52 A and packet data 52B, respectively, in on-chip memory of a PFE, or in a combination of on-chip and off-chip memory. The PBUF provides storage for the VOQs until the VOQs can forward traffic to the egress ports.

In one example approach, PBUF 50A is operatively coupled to ingress PFE 30A by communication channel 54A, which in some examples may be an optical or silicon interconnect. Similarly, PBUF 50B is operatively coupled to ingress PFE 30B by communication channel 54B, which may also be an optical or silicon interconnect. Ingress PFE 30A further includes VOQ manager (VOQ_M) 42A, storage manager (SM) 44A, VOQ 46A, and packet references 48A. Ingress PFE 30B further includes VOQ_M 42B, SM 44B, VOQ 46B, and packet references 48B. Egress PFE 30N includes one or more schedulers 56 and an output buffer (OB) 58. FIG. 3 includes simplified illustrations of the various components and other components not shown may also be included in, for example, ingress PFEs 30A and 30B, and egress PFE 30N.

In the example of FIG. 3, egress PFE 30N receives network packets from ingress PFE 30A and ingress PFE 30B via switch fabric 26. In one example approach, scheduler 56 on egress PFE 30N implements one or more scheduling techniques to service packet forwarding requests from ingress PFEs 30A, 30B. In one example approach, for instance, ingress PFEs 30A, 30B may each send requests to forward queued network packets stored in, for instance PBUFs 50A and 50B, respectively, to egress PFE 30N. Scheduler 56 processes the requests and sends grant messages in return using one or more scheduling techniques. In response to receiving the grant message, the respective ingress PFE forwards the network packet to egress PFE 30N. As shown in FIG. 3, egress PFE 30N may also include output buffer 58. Output buffer 58 stores network packets received from ingress PFEs 30A, 30B prior to egress PFE 30N forwarding the packet out to the network via one or more of IFCs 38.

Ingress PFE 30A, as shown in FIG. 3 includes VOQ 46A. VOQ 46A, in some examples, stores network packets prior to ingress PFE 30A sending the network packets to egress PFE 30N. In some example approaches, VOQ 46A stores network packets using on-chip memory, off-chip memory (e.g., DRAM), or a combination of on-chip and off-chip memory. In the example of FIG. 3, VOQ 46A uses PBUF 50A to store network packets 52A and on-chip memory 48A to store pointers or references to the network packets 52A stored in PBUF 50A. In this way, fast but relatively expensive on-chip memory is used to maintain the state of packets stored in VOQ 46A while storing the data in relatively slower but cheaper off-chip memory. VOQ 46B, packet references 48B, PBUF 50B, and network packets 52B are configured in the same or similar manner as described with respect to previously described components of ingress PFE 30A. In the example of FIG. 3, each of VOQs 46A and 46B store network packets that are subsequently forwarded to egress PFE 30N and stored at output buffer 58.

As noted above, in some example approaches, ingress PFE 30A includes storage manager 44A. In some example approaches, each VOQ 46 is allocated memory in PBUF 50 sufficient to buffer enough packets to meet OQ burst absorption needs in a single VOQ as described above. In other example approaches, storage manager 44A manages and allocates pages of memory of PBUF 50A to store network packets 52A. Generally, a page is a fixed-size block of memory and, in this discussion, is the unit of memory allocation. In one such example approach, pages are allocated by storage manager 44A and at least some of the allocated pages are used to store network packets received at the ingress PFE 30A. For instance, storage manager 44A may maintain pages of memory for each VOQ that exists on ingress PFE 30A. In one example approach, each storage manager 44A maintains a data structure, such as a linked list of pages of memory, for each VOQ. When storage manager 44A receives a request to allocate or deallocate space in PBUF 50A for a given VOQ, storage manager 44A determines the VOQ identified by the request and performs one or more operations to allocate or deallocate pages of memory. Storage manager 44A can further store one or more network packets specified by the request in PBUF 50A in an allocation request. In a deallocation request, storage manager 44A can free pages of memory that correspond to data specified in the request. Storage manager 44B may operate in the same or similar manner as storage manager 44A.

Figure 6:
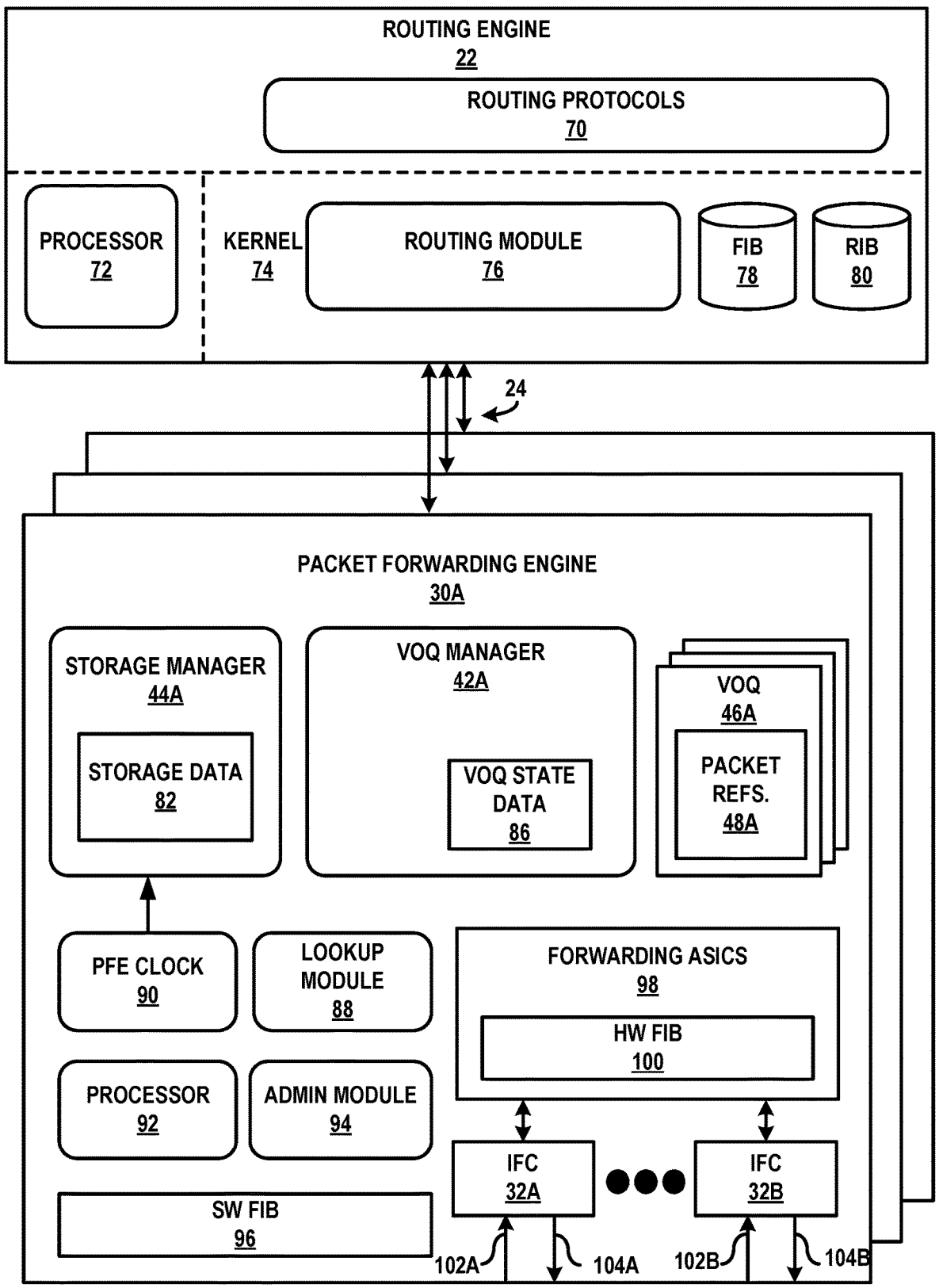
FIG. 6 is a block diagram illustrating in further detail a routing engine and an ingress packet-forwarding engine of a router as shown in FIGS. 2 and 3, in accordance with techniques of the present disclosure.

Ingress PFE 30A includes VOQ manager (VOQ_M) 42A. In one example approach, a lookup module (such as lookup module 88 as shown in FIG. 6) of ingress PFE 40A initially receives network packet 40 via an ingress interface. In response to receiving network packet 40, the lookup module performs an ingress lookup based on keying information of the network packet to determine a forwarding next hop for the network packet. The lookup module determines, for example, that the forwarding next hop for network packet 40 is the egress interface of egress PFE 30N that is associated with output buffer 58.

It has become apparent that, to emulate the behavior of an ideal OQ switch in a system of VOQs, one cannot treat each VOQ feeding an output buffer 58 as an independent flow. The reason is that, in an ideal OQ buffer, it is desirable to treat network packets from a "scatter-gather" application, for example, as a single flow going towards a single destination. Ideal output queued switch behavior is also desirable for improved burst absorption during congestion (so that independent of the source the traffic is buffered until the OQ buffer limit is reached) and to reduce reordering in the destination when the packets are buffered in a single OQ buffer and pulled out in a FIFO order.

One way to achieve the ideal output queued behavior is to drop packets in the VOQs when the network packets have not been transmitted from the switch within a maximum resident time. In one example "head drop" approach, each VOQ drops packets as they are dequeued from the VOQ. In one example approach, scheduler 56 compares a resident time calculated based on the timestamp of each network packet to a threshold maximum resident time and notifies one or more of the VOQs 46 associated with the output buffer 58 that network packets at the head of the VOQ should be dropped. In one example approach, each VOQ 46 drops a pre-defined amount of network packet traffic. In one such example approach, all network traffic for a predefined amount of time is dropped by each VOQ. For example, each VOQ 46 may be set to drop a microsecond worth of network packet traffic as part of this head drop process.

Another way to achieve the ideal output queued behavior is to transmit the packets in the order of arrival into the switch 6 and to drop network packets at every VOQ based on the total occupancy level of the "Output Queue" (which is logically living on the egress PFE and is the total of the occupancy level of all VOQs for that OQ). In one example approach, VOQ_M 42A determines whether to selectively drop packets received at ingress PFE 30A or stored in ingress PBUF 50A based on an approximation of the total occupancy level of the "Output Queue." In one such example approach, each VOQ_M 42A is informed of the total aggregated OQ depth and can make drop decisions before the network packet is enqueued in the VOQ (a "tail drop" approach). VOQ_M 42A may, however, in both the maximum resident time head drop approach and the approximate OQ level tail drop approach, employ more complex congestion avoidance techniques. Congestion avoidance techniques may include, for example, Weighted Random Early Detection (WRED), Random Early Detection (RED), and Weighted Tail Drop. In some example approaches, instead of simply dropping the packets, a selection of packets are marked with congestion markings and forwarded to the egress PFE.

In one example approach, VOQ_M 42A ensures that packets are admitted into the Output Queue in the order of arrival into the switch, by timestamping the packets; Scheduler 56 then selects the network packet with the earliest timestamp (i.e., longest time resident in the VOQ) for transmission to output buffer 58. In one such example approach, a global synchronized clock is shared across all the PFEs in the system and each network packet is stamped with this global timestamp. The ingress PFE then transmits the timestamp corresponding to the time of arrival of the network packet at the ingress PFE with each REQ. The appropriate scheduler 56 then picks the network packet with the lowest timestamp. Such an approach is, however, wasteful of the request/grant bandwidth between the ingress and egress PFEs.

Figure 4:
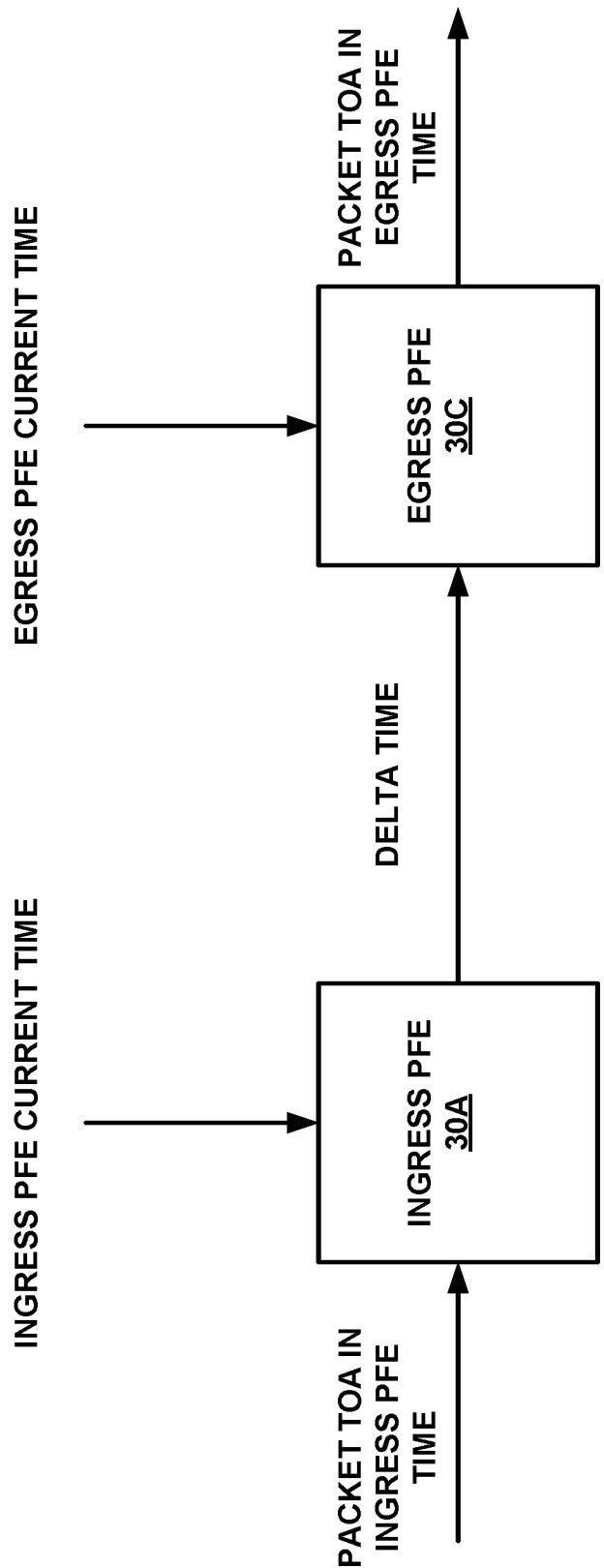
FIG. 4 is a diagram illustrating transfer of time of arrival as delta time.

FIG. 4 illustrates a different approach. FIG. 4 is a diagram illustrating transfer of time of arrival as delta time. In the example approach shown in FIG. 4, each VOQ_M 42 tracks the amount of time since a network packet arrived at the ingress PFE based on the time of arrival measured by the ingress PFE clock (INGRESS PFE CURRENT TIME) and transfers that time since arrival as a delta time with each REQ, with each packet, with each network packet group or with each page of network packets, depending on the overhead desired. In this discussion, a network packet group is a collection of one or more network packets; network packets in the network packet group are transmitted as a group across the fabric. A page of network packets is a network packet group where the network packets in the group are those network packets stored in a given page of PBUF 50.

In one example approach, the egress PFE uses the delta time value to reconstruct the timestamp in its local clock (EGRESS PFE CURRENT TIME). Such an approach assumes that the transit time across the fabric is zero, or approximately a fixed value. Such an approach is shown in FIG. 4. If the ingress PFE tells the egress PFE how long it has been since the packet has arrived (the delta time when the message was received instead of an absolute timestamp) then the egress PFE may reconstruct the timestamp in its local clock. Such an approach solves the issue of synchronizing the timestamp clocks across all devices in the system. The above approach also ensures that there is a timestamp in the egress PFE corresponding to the timestamp in the ingress PFE, but generated from the local clock of the egress PFE.

With respect to network packet drops, in one approach scheduler 56 in egress PFE 30N sends a message to one or more of the ingress PFEs 30 telling the PFEs packets are being dropped. In another example approach, each ingress PFE monitors overall OQ buffer size and drops packets as needed, as will be discussed below.

Figure 5A:
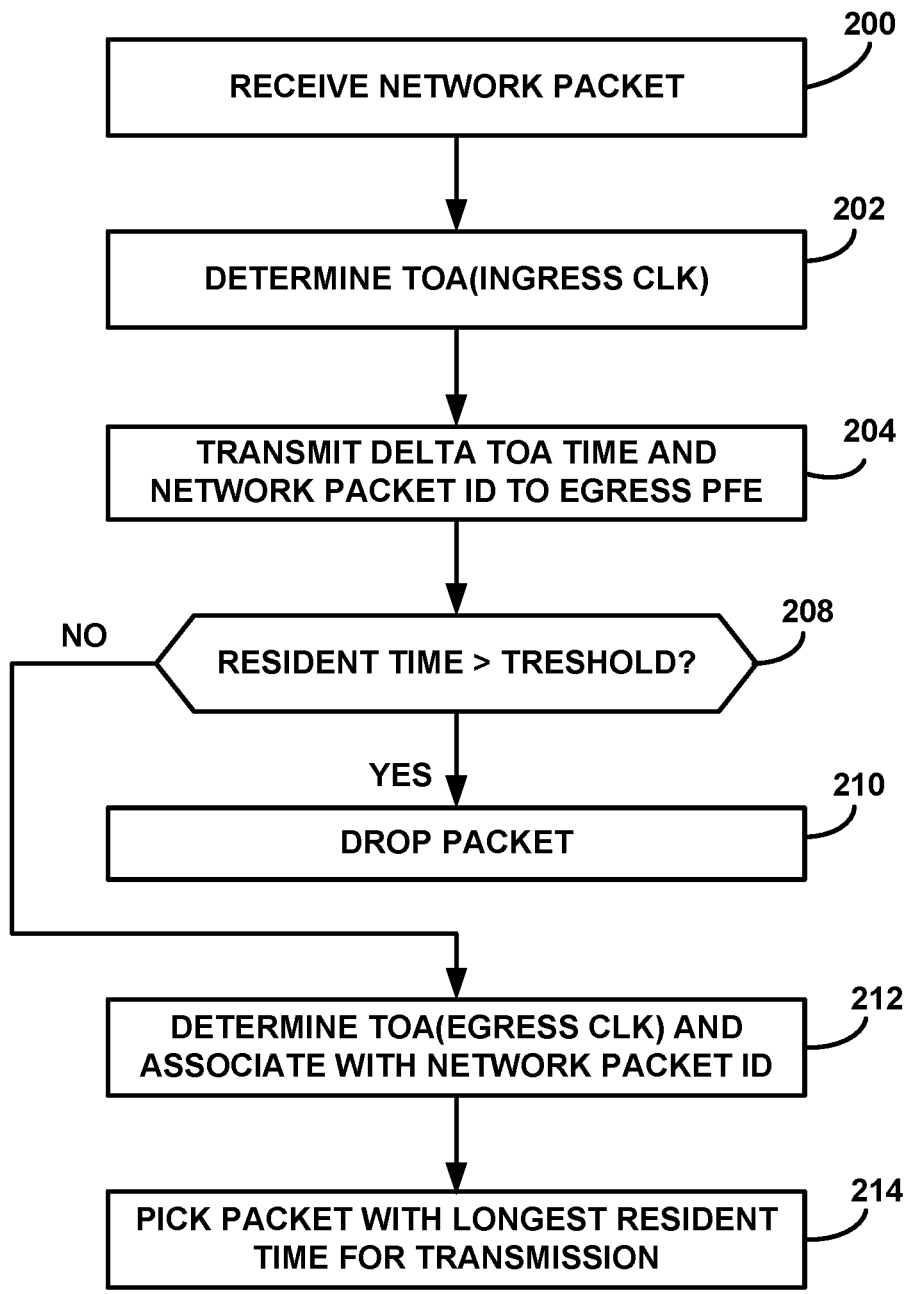
FIG. 5A is a flowchart illustrating an example mode of operation for a forwarding unit of a router operating per techniques described herein.

FIG. 5A is a flowchart illustrating an example mode of operation for forwarding units of a router operating according to techniques described herein. An ingress forwarding unit, such as any of PFEs 30 illustrated and described with respect to FIGS. 2, 3, 6 and 7, receives a network packet 40 (200) and calculates time of arrival based on the PFE clock (PFE clock 90 in FIG. 6) for the ingress forwarding unit (202). The ingress PFE 30A calculates a delta time from the time of arrival and transmits the delta time with the network packet ID to the egress PFE 30N (204). Egress PFE 30N determines if the time the network packet has been resident in the switch is greater than a threshold maximum resident time value (i.e., the OQ is overflowing) (208). If so (YES branch of 208), the packet is dropped (210). If, however, the buffer size is less than or equal to the threshold value (NO branch of 208), the egress PFE determines a time of arrival based on the egress PFE clock and stores the egress PFE clock-based time of arrival with the network packet ID in memory of the egress PFE (212). When space opens in the output buffer 58, the egress PFE grants permission to the VOQ with the oldest network packet to sending that packet to the egress PFE (214).

In the following discussion, the egress PFE refers to the ingress PFE VOQ that is sending it network packets as a Virtual Input Queue (VIQ). That is, scheduler 56 "serves" the VIQs. There is one VIQ per VOQ. That is, for each OQ, there is one VIQ per ingress PFE. In one approach, a memory location associated with each VIQ stores the timestamp of the packet at the head of its associated VOQ.

In one example approach, Grant Scheduler 56 uses a programmable threshold to determine whether to snapshot all the active VIQs when the OQ becomes congested. In some example approaches, an OQ buffer length count is used to indicate OQ congestion. In other example approaches, a maximum acceptable resident time for a packet, packet group or page is used to signal a congested output queue. In some example approaches, all VOQs in that snapshot are asked to do a head drop as they receive the GNTs subsequently sent to them by the egress PFE. During this period, GS 56 picks candidate VOQs from the snapshot vector rather than picking the VOQ having the packet, packet group or page with the maximum resident time. In one example approach, a grant (GNT) is sent to one of the VOQs in the snapshot each time a space opens up in output buffer 58 of egress PFE 30N.

As noted above, in some example approaches, once Grant Scheduler 56 has taken a "snapshot" of active VOQs, and has sent one Grant apiece to each such VOQ, the GS 56 returns to longest-residence-time-first selection. However, in one example approach, GS 56 will not take another "snapshot" nor trigger additional head-drops, for a programmed time after leaving snapshot mode. In one such example approach, the programmed time is set to approximately the round-trip-time (RTT) of fabric 26, to allow all the VIQ timestamps to be updated to post-head-drop values.

Figure 5B:
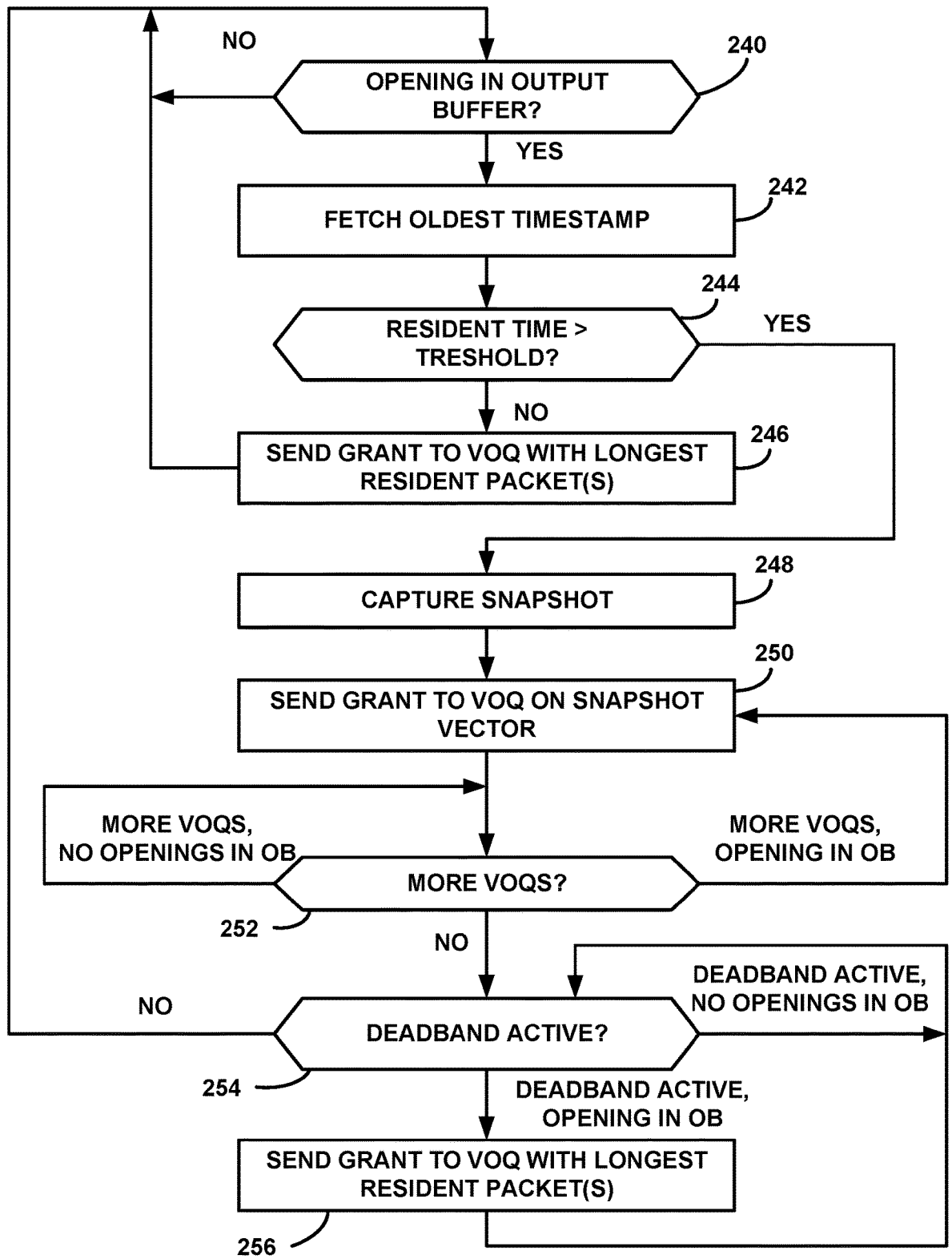
FIG. 5B is a flowchart illustrating an example snapshot mode of operation for a grant scheduler according to techniques described herein.

FIG. 5B is a flowchart illustrating an example snapshot mode of operation for a grant scheduler according to techniques described herein. In the example shown in FIG. 5B, grant scheduler 56 checks at 240 to see if there are openings in the output buffer. If not (NO branch of 240), grant scheduler 56 remains at 240. If, however, there are openings in the output buffer (YES branch of 240), grant scheduler 56 fetches the oldest timestamp (242) and checks at 244 to see if the resident time of the packet, packet group or page associated with the timestamp has a resident time greater than the maximum resident time threshold. If not (NO branch of 244), grant scheduler 56 sends a grant to the VOQ associated with the timestamp (246), receives the packet, packet group or page associated with the timestamp and returns to 240.

If, however, the resident time of the packet, packet group or page associated with the timestamp has a resident time greater than the maximum resident time threshold (YES branch of 244), grant scheduler 56 captures a snapshot of active VOQs (e.g., VOQs with outstanding requests, or VOQs that have issued a request in the past x microseconds where, in some example approaches, x is configurable by the administrator) and stores a designation of the active VOQs as a snapshot vector (248). Grant scheduler 56 sends a grant (GNT) to an active VOQ listed in the snapshot vector (250), if any, and proceeds to 252.

At 252, grant scheduler 56 checks to see if there are any active VOQs that have not received a grant. If there are active VOQs that have not received a grant and there are openings in the output buffer (MORE VOQS, OPENING IN OB branch of 252), grant scheduler 56 sends a grant (GNT) at 250 to one of the active VOQs that has not yet received a grant and proceeds to 252. If, however, there are active VOQs that have not received a grant and there are no openings in the output buffer (MORE VOQS, NO OPENINGS IN OB branch of 252), grant scheduler remains at 252. Otherwise, if there are no active VOQs that have not received a grant (NO branch of 252), grant scheduler 56 activates a dead band time before proceeding to 254. As noted above, in one example approach, the programmed dead band time is set to approximately the round-trip-time (RTT) of fabric 26, to allow all the timestamps to be updated to post-head-drop values.

At 254, grant scheduler checks to see if the dead band time is still active. If not (NO branch of 254), grant scheduler 56 checks at 240 to see if there are openings in the output buffer. If the dead band time is still active but there are no openings in the output buffer, grant scheduler 56 remains at 254. If the dead band time is still active and there are openings in the output buffer, grant scheduler 56 sends a grant to the VOQ associated with the oldest timestamp (246), receives the packet, packet group or page associated with the timestamp and returns to 254. In the example approach shown in FIG. 5B, grant scheduler 56 does not check, during the dead band time, to see if the timestamp indicates a resident time greater than the maximum resident time threshold.

In one example approach, the timestamps calculated as a function of local ingress PFE time are stored with their associated network packets in the appropriate VOQ. In another example approach, the timestamps calculated as a function of the local ingress PFE time are stored in the page containing the corresponding network packet, in other pages in memory or in metadata associated with a packet grouping or memory page. In one example approach, each group of packets includes associated metadata; the timestamp of the most recently arriving network packet in the packet group is saved as the timestamp of the packet group in the metadata. in one such example approach, the metadata from one packet group is stored with the data of the previous packet group. Scheduler 56 selects the network packet, packet grouping or page with the lowest resident time from all the ingress PFE VOQs that are both currently active and actively trying to send packets to the scheduler's output buffer 58, with appropriate attention to wraparounds in the timestamps.

Figure 5C:
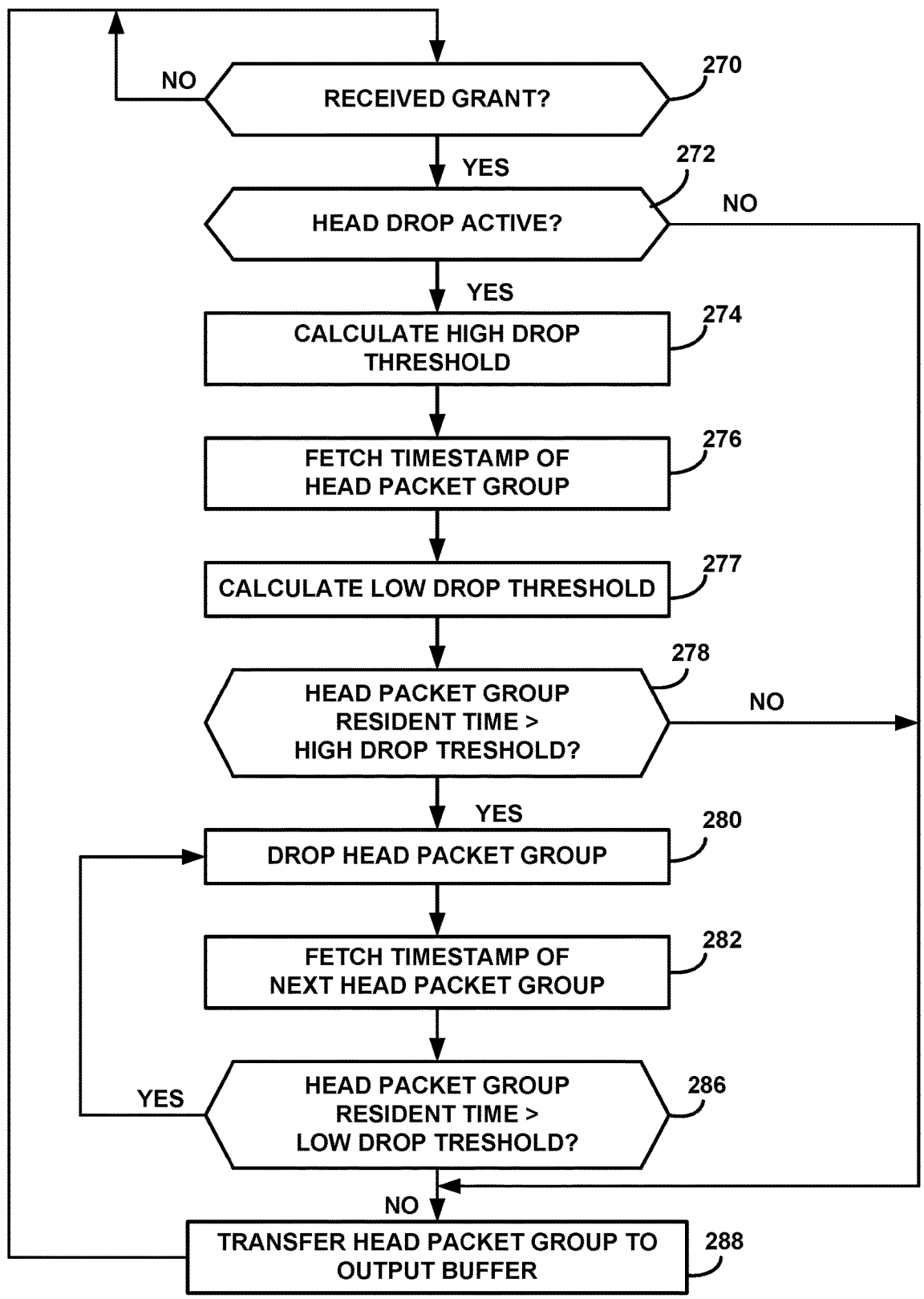
FIG. 5C is a flowchart illustrating an example head drop mode of operation for a VOQ manager according to techniques described herein.

FIG. 5C is a flowchart illustrating an example head drop mode of operation for a VOQ manager according to techniques described herein. In one example approach, each VOQ has, as configuration settings, a head drop threshold and a head drop duration (also known as head drop hysteresis). In one such example approach, as shown in FIG. 5C, the VOQ manager drops packets, packet groups and pages of packets that have timestamps greater than or equal to a high drop threshold, where the high drop threshold is calculated by subtracting the head drop duration from the head drop threshold.

In the following discussion, the ingress PFE will be acting on packet groups. That is groups of one or more network packets that share a single timestamp. The method described works equally well on packets and on pages of packets. As shown in FIG. 5C, VOQ manager 42A checks at 270 to determine if a GNT has been received from the egress PFE 30N. If not (NO branch of 270), VOQ manager 42A remains at 270. If, however, VOQ manager 42A determines at 270 that a GNT has been received from the egress PFE 30N (YES branch of 270), VOQ manager 42A checks the grant to determine if a head drop is indicated (272). In one example approach, a bit in the header of the GNT, when set, indicates a head drop condition. If a head drop is not indicated (NO branch of 272), VOQ manager 42A transfers the head packet group from VOQ 46A to output buffer 58 of egress PFE 30N (288) before returning to 270.

If, however, a head drop is indicated (YES branch of 272), VOQ manager 42A calculates a high drop threshold (274), fetches the timestamp of the head packet group (276), calculates a low drop threshold (277) and determines if the resident time of the head packet group is greater than the high drop threshold (278). In one example approach, VOQ manager 42A calculates the high drop threshold by subtracting the head drop duration from the head drop threshold. VOQ manager 42A calculates the low drop threshold as the minimum of the head drop threshold and a threshold calculated by subtracting the head drop duration from the residence time of the head packet group in the VOQ 46A queue. That is, Low_drop_threshold=min(residence time(head packet group)−head drop duration, head drop threshold)

If the resident time of the head packet group is not greater than the high drop threshold (NO branch of 278), VOQ manager 42A transfers the head packet group from VOQ 46A to output buffer 58 of egress PFE 30N (288) before returning to 270. If, however, the resident time of the head packet group is greater than the high drop threshold (YES branch of 278), VOQ manager 42A drops the head packet group (280) and fetches the timestamp of the next packet group in the queue of VOQ 46A (282). VOQ manager 42A checks to determine if the resident time of the current head packet group is greater than the low drop threshold (286). If not (NO branch of 286), VOQ manager 42A transfers the head packet group from VOQ 46A to output buffer 58 of egress PFE 30N (288) before returning to 270. If, however, the resident time of the current head packet group is greater than the low drop threshold (YES branch of 286), VOQ manager 42A drops the head packet group (280), and fetches the timestamp of the next packet group in the queue of VOQ 46A (282) before moving to 286.

In the approach described above in FIG. 5C, VOQ manager 42A clamps the effective drop threshold to no lower than (nominal drop threshold−head drop duration). Such an approach ignores the grant scheduler drop if the grant scheduler signals drops to a non-congested queue. Similarly, in the approach described above in FIG. 5C, VOQ manager 42A clamps the low drop (hysteresis) threshold to no larger than the nominal head drop threshold. This prevents the queue from growing without bound in situations where grants arrive very slowly, spaced apart by more than the hysteresis-equivalent delay. Example configurations of VOQ manager 42A are, for a deep buffer PFE, a head drop threshold of 100 ms and a head drop duration (hysteresis) of 10 microseconds and, for a shallow buffer PFE, a head drop threshold of 100 microseconds and a head drop duration (hysteresis) of 10 microseconds.

In one example approach, the equations for deriving the timestamps for the ingress PFE VOQs are as follows. Assume that the ingress PFE has communicated the Delta Time of the packet that is at the head of the VOQ. (In this discussion, the egress PFE refers to the ingress PFE VOQ that is sending it network packets as a VIQ; scheduler 56 "serves" the VIQs.) Then, VIQHeadPacketArrivalTimestamp= MyClockCurrentTime−VIQHeadPacketDeltaTime Since this is the Timestamp for the head packet of the VIQ, stamp the VIQ with this timestamp.

VIQTimestamp=VIQHeadPacketArrivalTimestamp or

VIQDeltaTime=VIQHeadPacketDeltaTime

Rewrite the earlier equation in the wall clock of egress PFE as

VIQTimestamp=MyClockCurrentTime−VIQDeltaTime

Scheduler 56 then picks the VIQ packet with the largest resident time. This means scheduler 56 picks the VIQ that has the head packet that arrived earlier than all other packets in all the other VIQs. So, from the previous equation:

VIQResidentTime=MyClockCurrentTime−VIQTimestamp

From an implementation standpoint, in one example approach, fixed width registers hold each of the above values. One possible implementation and possible optimizations are described below.

Assume egress PFE 30N is counting time in microseconds and that egress PFE 30N has a 19-bit register to hold the current clock and resident time timestamp values. This means the timestamp range covers a resident time of 512K microsecond, which is ~512 ms. In one example approach, egress PFE 30N will never see a packet with a resident time of greater than 256 ms. Furthermore, from the moment the egress PFE sees the packet timestamp, the packet is guaranteed to be serviced within 256 ms. This prevents a case of the egress PFE current clock time overtaking the VIQTimestamp, making the egress PFE 30N think the VIQ with the oldest timestamp is now the VIQ with the newest timestamp. With this assumption, VIQTimestamp[18:0]=MyClockCurrentTime[18:0]−VIQResidentTime[18:0]

VIQResidentTime[18:0]=MyClockCurrentTime[18:0]−VIQTimestamp[18:0]

In one example approach, each VIQ stores the VIQTimestamp[18:0]. Egress PFE 30N therefore must compute VIQResidentTime [18:0] every time it decides to pick the VIQ (that is, MyClockCurrentTime [18:0] is always moving forward). This means that scheduler 56, using fixed width math, picks the VIQ with the largest absolute value of VIQResidentTime [18:0] every time a decision is made by scheduler 56.

In one example approach, each ingress PFE sends an ingress PFE clock-based timestamp with each REQ. Such an approach, however, requires a great deal of the REQ channel bandwidth and, in some approaches, there is not enough bandwidth on the REQ channel to send timestamp information with every REQ. In such systems, sending the timestamp (delta time) with the network packet data of the previous packet (or in a page containing the network packet data of the current or previous packet) is a very close approximation of the timestamp of the next packet/page to be serviced.

In one example approach, the ingress PFE clock-based timestamp is stored per packet group instead of per packet. As noted above, in this discussion, a network packet group is a collection of two or more network packets; network packets in the network packet group are transmitted as a group across the fabric. Each network packet group has a single timestamp. Also, as noted above, a page of network packets is a network packet group where the network packets in the group are those network packets stored in a page of PBUF 50. In one such example approach, the timestamp is stored by storage manager 44A in the metadata of the linked list of pages maintained for each VOQ. Such an approach places a 19 b tax for every page (or 256K*19=4.8 Mb of on chip storage for 256K pages). Such an approach also means one can update the timestamp information when the page is closed and, since the ingress PFE often closes a page (especially a congested page which grows close to max page threshold) only when the last packet that arrived into the page is not able to fit into that page, it can carry as data the timestamp for the packet at the head of the next page.

In another example approach, ingress PFE 30A writes the ingress PFE clock-based timestamp to PBUF 50 (e.g., at the head of the page containing the network packet, as part of the network packet header of the current or previous network packet, or any of the other techniques discussed herein); this means router 6 only pays 1 chunk (16B) for every page when the first packet is written into the page.

In one example approach, router 6 provides better fabric utilization because the ingress PFEs convert packets into cells. Cells have a predictable size, which enables the switch to spray the cells evenly across the fabric links and more fully utilize the fabric links. Packets vary greatly in size, and packet size is not predictable. Packet-based fabrics can deliver no better than 65-70 percent utilization because of the variation and unpredictability of packet sizes. Cell-based fabrics, on the other hand, can deliver a fabric utilization rate of almost 95 percent because of the predictability of and control over cell size. In one such embodiment, ingress PFE 30A extracts the timestamp from the packet when converting the packets into cells, computes the delta time and transports the delta time to the egress PFE separate of the packet. In another example approach, ingress PFE 30A strips the chunk carrying the timestamp when converting a page into cells before transmitting the cells over the switch fabric 26 to the egress PFE.

In yet another example approach, ingress PFE 30A writes the ingress PFE clock-based timestamp to the network packet in the last chunk when there is space left beyond the eop of the packet. For example, on a system that transfers network packets as 16 byte chunks, on average, there is opportunity to save the timestamp in the last 16-byte chunk when the packet eop byte is not on byte position 13/14/15 in the last chunk. Assuming you need 3B for storing the timestamp, when any of the last 3 bytes are used by the packet, one will need to add an additional chunk to the packet and write it to PBUF 50. When the next packet is added, the ingress PFE will need to rewind by 1 chunk for the additional chunk added. The tradeoff is complexity vs. area cost in saving the timestamp.

In another example approach, in an implementation using variable cell size where cells transmitted across the fabric can vary in size up to 11 chunks, the ingress PFE inserts the delta time into the last cell of the packet group by adding one more chunk to the cell provided the cell is less than eleven chunks. If the cell already includes eleven chunks, the ingress PFE creates a separate DATA cell that carries this information.

In another such example approach, in an implementation using variable cell size where cells transmitted across the fabric can vary in size up to 11 chunks, the ingress PFE transmits the timestamp using an entire chunk, as long as the last cell is 10 or fewer chunks. More generically, the ingress PFE adds the delta time into the last cell of the page if that cell has extra bits (past the end of the packet data) sufficient to store the delta time.

Timestamp-based scheduling by scheduler 56 in the egress PFE will be discussed next. In one example approach, the egress PFE separates the VOQ timestamps from the last cells of the page and sends them to Scheduler 56 to update the timestamp of the VIQ. In one example approach, the timestamp stored in Scheduler 56 is the timestamp of the packet computed based on the local egress PFE clock. Note that, in some example approaches, the egress PFE does not store the resident time of the packet in Scheduler 56 for each VIQ; instead the egress PFE stores the arrival timestamp of the VIQ based on the egress PFE clock, which is computed from the Delta Time received from, for example, the ingress PFE cell. If egress PFE stored the resident time of the head packet of the VIQ, then it would not be able to differentiate between 2 VIQs where one arrived now with a resident time of, for instance, 10 ms and another one arrived 10 ms later and said the resident time was 10 ms. Hence the need to store the timestamp as a time of arrival of the packet at the VIQ expressed in the local PFE clock.

Once the timestamp is stored per VIQ in scheduler 56, scheduler 56 picks the packet or page with the largest value of resident time, as described earlier.

VIQResidentTime[18:0]=MyClockCurrentTime[18:0]−VIQTimestamp[18:0]

Note that here the MyClockCurrentTime keeps moving forward. In one example approach, the VIQ nodes are implemented under the OQ node in scheduler 56 as a hierarchy of nodes. In one example approach, when the VIQ becomes active (empty to non-empty transition) the REQ does not carry a timestamp message and hence egress PFE 30N assumes that this packet is a recently arrived packet and gives it a timestamp of MyClockCurrentTime. When egress PFE 30N receives a timestamp in the packet and if the timestamp says that the packet arrival timestamp is more than 256 ms in the past, in one example approach, scheduler 56 has the option of clamping the timestamp to MyClockCurrentTime−256 ms.

Packet drops will be discussed next. In one example approach, scheduler 56 makes a drop decisions based on the total occupancy level of the hypothetical OQ. In one such approach, each VOQ sends its current occupancy levels and then scheduler 56 sums them up. Saving the length of each VIQ is not, however, practical in storage. And on top of that router 6 would have to pay for the bandwidth on the fabric for this back and forth messaging channel between the egress PFE and its associated ingress PFEs.

As noted above, when emulating an ideal OQ buffer, one cannot treat each VOQ feeding an output buffer 58 as an independent flow. The reason is that in an ideal OQ buffer, it is desirable to treat network packets from a "scatter-gather" application, for example, as a single flow going towards a single destination. Ideal output queued switch behavior is also desirable for improved burst absorption during congestion (so that independent of the source the traffic is buffered until the OQ buffer limit is reached) and to reduce reordering at the destination when the packets are buffered in a single OQ buffer and pulled out in a FIFO order. To accomplish this, one may keep track of total OQ occupancy at every VOQ for use, for example in making a network packet drop decision.

In one approach, one would send the VOQ length from each VOQ to the OQ and let the OQ sum it up and return the total OQ length seen at the egress PFE. To sum up all the lengths when router 6 is continuously receiving messages, one would need to save the lengths for each VIQ, sum them up and transmit the computed OQ length to each ingress PFE with an active VOQ associated with output buffer 58. Such an approach would be bandwidth intensive.

In one example approach, egress PFE 30N tracks OQ buffer size as described above in the flowchart of FIG. 5. Egress PFE may, in some example approaches, employ more complex congestion avoidance techniques. Congestion avoidance techniques may include, for example, Weighted Random Early Detection (WRED), Random Early Detection (RED), and Weighted Tail Drop.

When grant scheduler VIQs go empty, instead of clearing the timestamp immediately, in one example approach, a background thread slowly sweeps the timestamps to the current time. This is done to avoid any error in resetting the timestamp when a VIQ goes empty (without the VOQ going empty).

FIG. 6 is a block diagram illustrating in further detail routing engine 22 and ingress packet-forwarding engine 30A of router 6 as shown in FIGS. 2 and 3, in accordance with techniques of the present disclosure. Routing engine 22 may include various routing protocols 70, such as Multiprotocol Label Switching (MPLS), Resource Reservation Protocol (RSVP), Border Gateway Protocol (BGP), etc. Routing protocols 70 interact with kernel 74 (e.g., by way of API calls) to update routing information base (RIB) 80 based on routing protocol messages received by routing engine 22. For instance, kernel 74, executing at processor 72, generates forwarding information in the form of forwarding information base (FIB) 78 based on the network topology represented in RIB 80. Routing module 76 may determine the physical interface allocated to ingress PFE 30A to be used for forwarding next hops that are included in the forwarding information. Routing module 76 then programs PFE 30A to install copies of the FIB 78 as software FIB 96 of ingress PFE 30A. Processor 72, in some examples, includes a CPU and/or memory and can provide processing resources for one or more components including kernel 74, routing module 76, FIB 78, RIB 80, etc.

Processor 92 of ingress PFE 30A, in some examples, includes a CPU and/or memory and can provide processing resources for one or more components of ingress PFE 38A including storage manager 44A, VOQ manager 42A, lookup module 88, PFE clock 90, administrator module 94, forwarding ASICs 98, etc. Processor 92 may execute a microkernel to provide an operating environment for one or more interfaces between components. PFE clock is used to record time of arrival of network packets 40, as described above.

FIG. 6 also depicts example embodiments of ingress PFE 30A in further detail. PFE 30A includes storage manager 44A as shown in FIG. 3. Storage manager 44A manages storage data 82. In some examples, storage data 82 includes one or more data structures to manage pages of PBUF 50A that are allocated to VOQ 46A and other VOQs of ingress PFE 30A. In some examples, storage data 82 includes a linked list of pointers that reference pages of PBUF 50A that are allocated to each VOQ. To increase the size of VOQ 46A, storage manager 44A adds a pointer to an unallocated page of PBUF 50A to the linked list. Conversely, to decrease the size of VOQ 46A, storage manager 44A removes a pointer to an allocated page of PBUF 50A from the linked list.

Figure 7:
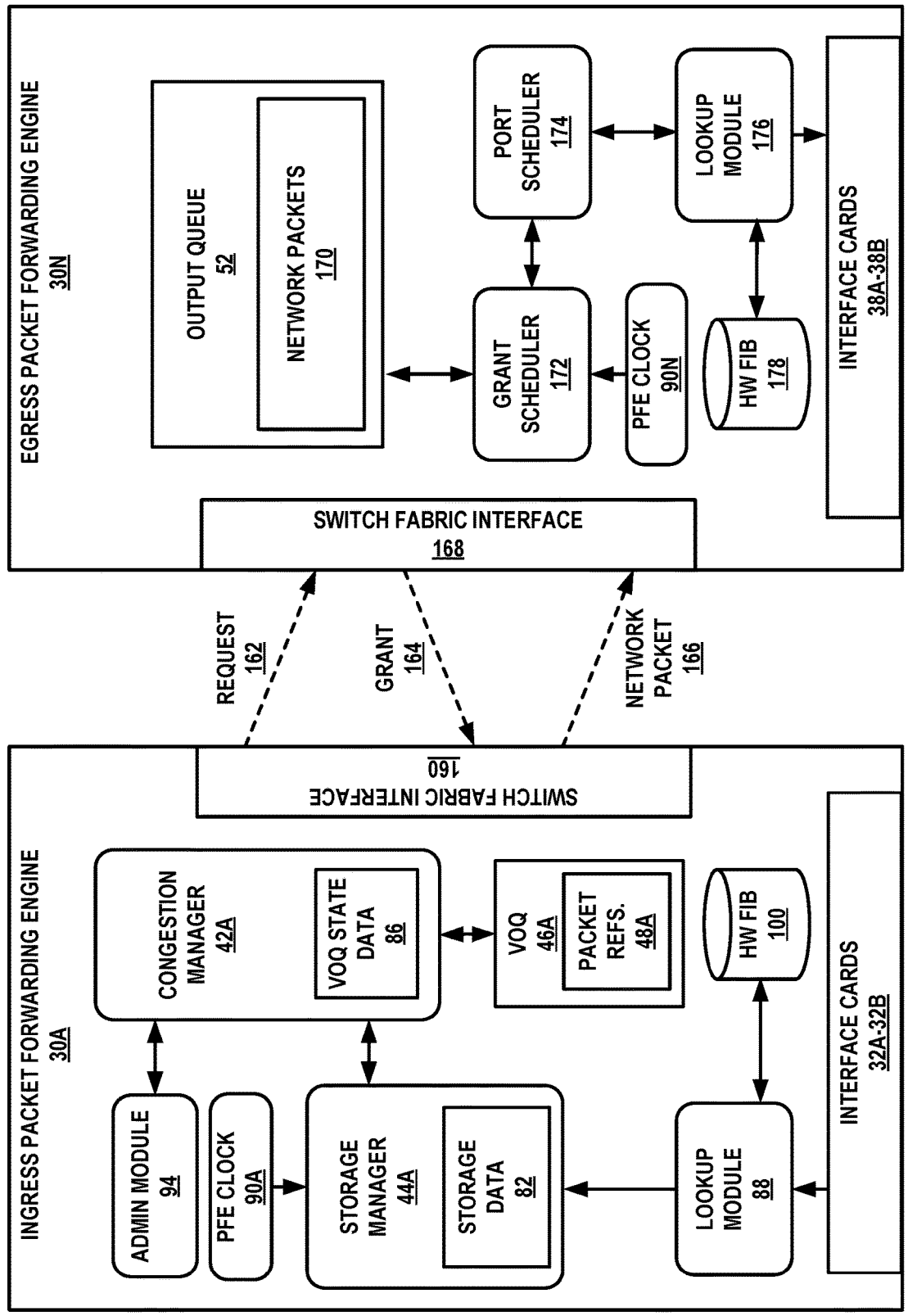
FIG. 7 is a block diagram that illustrates further details of the ingress and egress PFEs of FIG. 3, in accordance with techniques of the present disclosure.

VOQ_M 42A, in some examples, includes VOQ state data 86, as previously described in FIG. 3 and further described in FIG. 7. Examples of VOQ state data 86 include VOQ identifier, and VOQ size. VOQ_M 42A periodically updates VOQ state data 86 as network packets are processed by VOQ_M 42A. For instance, VOQ_M 42A may include multiple separate processes to update different VOQ state data.

As shown in FIG. 6, ingress PFE 30A also includes lookup module 88. Lookup module 88, in some examples, receives forwarding information of FIB 78 from routing engine 22 and stores the forwarding information in software FIB 96. Lookup module 88, in some examples, configures hardware FIB 100 of forwarding ASICs 98 to process network packets in accordance with the forwarding information of software FIG. 96.

For example, lookup module 88 of ingress PFE 30A determines from forwarding information of ingress PFE 30A that VOQ 46A is associated with output buffer 58 of egress PFE 30N. Consequently, in one example approach, the lookup module sends a VOQ identifier of VOQ 46A to VOQ_M 42A. In response to receiving the VOQ identifier, VOQ_M 42A determines VOQ state data associated with VOQ 46A. In some examples, VOQ_M 42A manages VOQ state data for each VOQ, such as VOQ 46A, included in ingress PFE 30. VOQ state data for VOQ 46A may include the current VOQ buffer size of VOQ 46A.

Hardware FIB 100 may include one or more lookup structures. Lookup structures can include associations between network prefixes, network routes, next hops, etc. For instance, an example of a lookup structure may include a radix tree. The radix tree may include hierarchically arranged nodes that correspond to keying information of a network packet, such as a network address, interface identifier, etc. In some examples, a leaf node of the radix tree is associated with a next hop, group of chained next hops, interface identifier, etc. Consequently, when ingress PFE 30A receives a network packet, forwarding ASICS 98 can use keying information (e.g., source network address, destination network address, protocol, source interface, destination) associated with the network packet to traverse the radix tree and select a next hop that corresponds to the keying information. Forwarding ASICs 100 may then process the network packet in accordance with the next hop.

In the current example, in one example approach, when VOQ_M 42A receives the VOQ identifier of VOQ 46A (and, in some example approaches, a timestamp corresponding to the time of arrival (TOA) of packet 40) in response to ingress PFE 30A receiving packet 40, VOQ_M 42A may determine the current buffer size of VOQ 46A and the current overall OQ buffer size from the VOQ state data 86 and drop the packet if the overall OQ buffer size indicates the OQ buffer is full (or if the arrival of the packet and the current OQ buffer size triggers any other congestion avoidance technique).

To enqueue network packet 40 in VOQ 46A, VOQ_M 42 sends an enqueue message to storage manager 44A that indicates VOQ 46A, network packet 40, and the TOA timestamp associated with network packet 40. In one example approach, storage manager 44A receives the message and determines the size pages in PBUF 50A that are allocated to VOQ 46A. If a page allocated to VOQ 46A is only partially full and the size of network packet 40 is less than or equal to the remaining free space of the page, in some example approaches, storage manager 44A stores network packet 40 and its associated time of arrival in the partially full page. If, however, the size of network packet 40 is greater than the remaining free space of the page, storage manager 44A allocates a new page of memory in PBUF 50A to VOQ 46A and stores network packet 40 and its associated time of arrival in the new page. In addition, storage manager 44A stores a pointer in packet references 48A to the memory address of the page in PBUF 50A that includes network packet 40.

In one example approach, storage manager 44A stores the TOA timestamp corresponding to the time of arrival of packet 40 with packet references 48A instead of with the packet data in PBUF 50A.

In another example approach, storage manager 44A receives a timestamp from PFE clock 90 corresponding to the TOA of network packet 40 and stores the timestamp with the packet ID associated with network packet 40 until the storage manager 44A receives an enqueue message for the network packet 40 from VOQ_M 42.

In one example approach, ingress PFE 30A calculates a delta time from the network packet TOA timestamp and sends the delta time to egress PFE 30N. Scheduler 56 calculates a TOA timestamp based on the egress clock time and returns the new timestamp to storage manager 44A. In response, storage manager 44a stores the egress PFE-based timestamp in packet references 48A or with the network packet data in PBUF 50A. When a network packet reaches the front of the queue, storage manager 44A sends a request message to egress PFE 30N to forward network packet 40 of VOQ 46A to egress PFE 30N. Scheduler 56, in response to determining that output buffer 58 includes free space to store network packet 40, sends a grant message that permit ingress PFE 30A to dequeue network packet 40 from VOQ 46A and forward network packet 40 to egress PFE 30N. Egress PFE 30N receives and stores network packet 40 at output buffer 58 until egress PFE 30N forwards network packet 40 to another network device. Upon dequeueing and forwarding network packet 40, storage manager 44A removes the pointer to network packet 40 from packet references 48A and may deallocate the memory of PBUF 50A that previously stored network packet 40, if desired.

As shown in FIG. 6, PFE 38A includes ASICs 98. ASICs 98 are microcode-controlled chipsets that are programmably configurable by processor 92 in accordance with hardware FIB 100. Specifically, one or more of ASICs 98 are controllable by microcode programmed by processor 92. One example of a network device including a packet processing engine having multiple microcode instruction memories is described in U.S. Pat. No. 6,976,154, issued Dec. 13, 2005, the entire contents of which are incorporated herein by reference. Processor 92 programs hardware FIB 100 into internal memory of ASICs 98 based on software FIB 96.

Ingress PFE 30A also includes administration module 94. In some examples, administration module 94 generates information to provide an interface that enables a user to specify one or more user configured parameters of a profile. For instance, administration module 96 can provide a graphical user interface that allows a user to specify one or more parameters of a profile. Example parameters may include ingress PFE port rate, VOQ buffer size, and drop precedence.

In accordance with techniques of the disclosure, ingress PFE 30A receives at network packet at ingress interface 32A via link 102A. As shown in FIG. 6, links 102A-102B and 104A-104B may be wired or wireless links to other network devices operatively coupled to router 6. Upon receiving the network packet, forwarding ASICs 98 determine a forwarding next hop in hardware FIG. 100 based on keying information of the network packet. Forwarding ASICs 98 determine that the forwarding next hop for the network packet is an egress interface of egress PFE 30N. Output buffer 58 may be associated with the egress interface of egress PFE 30N.

Forwarding ASICs 98 determine that VOQ 46A is associated with output buffer 58 and therefore send a VOQ identifier of VOQ 46A to VOQ_M 42A. Upon receiving the VOQ identifier, VOQ_M 42A determines VOQ state data 86 of VOQ 46A using the VOQ identifier.

In one example approach, VOQ_M 42A determines whether enqueueing the network packet at VOQ 46A could cause the buffer size of VOQ 46A to exceed the maximum OQ buffer size threshold. If the maximum OQ buffer size threshold would be exceeded, VOQ_M 42A drops the network packet. Alternatively, if VOQ_M 42A determines that enqueueing the network packet would not exceed the maximum OQ buffer size threshold, VOQ_M 42A may enqueue the network packet at VOQ 46A. Similar decisions may be made using congestion avoidance techniques such as, for example, Weighted Random Early Detection (WRED), Random Early Detection (RED), and Weighted Tail Drop.

FIG. 7 is a block diagram that illustrates further details of the ingress PFEs and the egress PFE of FIG. 3, in accordance with techniques of the present disclosure. As shown in FIG. 7, ingress PFE 30A includes PFE clock 90, administrator module 94, storage manager 44A, lookup module 88, VOQ manager (VOQ_M) 36A, VOQ 46A, hardware FIB 100, switch fabric interface 160, and interface cards 32A-32B. Storage manager 44A includes storage data 82. VOQ_M 42A includes VOQ bandwidth database 84 and VOQ state data 86. Storage manager 44A includes storage data 82. VOQ 46A includes packet references 48A.

Egress PFE 30N includes output buffer 58, which further includes network packets 170 received from ingress PFEs 30 or received at an ingress interface card 38B and routed locally to egress PFE 30N. Egress PFE 30N also includes switch fabric interface 168, grant scheduler (GS) 172, port scheduler 174, lookup module 176, hardware FIB 178, and interface cards 38A-38B. Output buffer 58 includes network packets 170. In some examples, switch fabric interface 160 provides an interface to switch fabric 26 that allows PFE 30A to exchange commands and data with other PFEs 30, such as egress PFE 30N on router 6. Similarly, switch fabric interface 168 provides an interface to switch fabric 26 that allows PFE 30N to exchange commands and data with other PFEs 30, such as egress PFE 30A on router 6.

FIG. 7 illustrates a grant-request scheduling technique used by ingress PFE 30A and egress PFE 30N to forward network packets, in accordance with techniques of the present disclosure. As described in previous examples, storage manager 44A, upon enqueueing a network packet, sends a request 162 to egress PFE 30N via switch fabric interface 160. In the example of FIG. 7, request 162 may include information specifying, for example, the size of the network packet enqueued at VOQ 46A. Furthermore, the request may indicate to egress PFE 30N that ingress PFE 30A is requesting to forward a network packet to egress PFE 30N. In some examples, request 162 includes a size of a memory page that includes one or more packets or portions of packets.

As shown in FIG. 7, grant scheduler 172 manages packet requests from ingress PFEs. In one example approach, grant scheduler 172 prioritizes by resident time, taking the longest resident network packet from whichever VOQ in which it is stored. In one such example, grant scheduler 172 processes requests from multiple ingress PFEs using equal-sized time slices. When grant scheduler 172 determines that egress PFE 30N has received request message 162 from ingress PFE 30A, grant scheduler 172 queues the request.

In addition to receiving requests from ingress PFEs, grant scheduler 172 further determines from port scheduler 174 whether one or more of network packets 170 can be forwarded via interface cards 38A-38B. Port scheduler 174 schedules network packets 170 to be output at interface cards 38A-38B. Port scheduler 174 can issue credits to grant scheduler 172 that notify grant scheduler 172 when another one of network packets 170 can be forwarded via interface cards 38A-38B.

In the current example, grant scheduler 172 receives a credit from port scheduler 174 that one of network packets 170 can be forwarded using interface cards 38A-38B. Grant scheduler 172, in response to receiving the credit, dequeues one of network packets 170 from output buffer 58. Lookup module 176 performs an egress lookup using hardware FIB 178 to determine a forwarding next hop. Lookup module 176 determines that interface card 38A is specified as the forwarding next hop. Egress PFE 30N subsequently forwards the network packet using interface card 38A.

In response to dequeueing the network packet that was previously forwarded by lookup module 176, grant scheduler 172 determines that it may grant the request message 162 from one of the ingress PFEs and receive the network packet corresponding to request 162. To grant the request, grant scheduler 172 sends grant message 164 to, for instance, ingress PFE 30A when it has the longest resident network packet 40. Storage manager 44A receives grant message 164 and dequeues the network packet specified by request 162 from VOQ 46A. Storage manager 44A then sends network packet 166 to egress PFE 30N. Upon sending the network packet, storage manager 44A may perform one or more deallocation operations to update storage data 82 as previously described herein to free the pages of memory that previously stored the network packet.

In one example approach, egress PFE 30N receives the network packet from storage manager 44A and egress PFE 30N queues the network packet at output buffer 58. Grant scheduler 172 subsequently waits until it is granted another credit from port scheduler 174 to dequeue one of network packets 170. As previously described, when grant scheduler 172 receives another credit, grant scheduler 172 dequeues another one of network packets 170, which lookup module 176 subsequently forwards. In this way, grant scheduler 172 and port scheduler 174 facilitate the scheduling and processing of network packets at output buffer 58.

As shown in FIG. 7, output buffer 58 may be implemented in on-chip memory, off-chip memory, or a combination of on-chip and off chip memory. Output buffer 58 may store network packets 170 received from ingress PFEs before forwarding the network packets to another network device using interface cards 38A-38B.

An alternate technique for emulating an OQ router with VOQs will be discussed next.

There are two behaviors that need to be reviewed to achieve output queued behavior: OQ FIFO order departure and OQ occupancy based admission (or drop probability). For OQ FIFO order departure, the previous sections described a timestamp-based Grant Scheduler used to achieve the OQ FIFO order of departure. The same mechanism may be used in shallow buffer PFE routers as well.

An alternate scheme that is effective at handling drops for shallow buffer PFEs will be described next. This same approach is used effectively for deeper buffered PFEs as well. One of the important aspects in a data center application is that router 6 needs to have the OQ burst absorption as described in earlier sections. At the same time, the egress PFE may wish to ensure that the total OQ buffer length as viewed externally never exceeds (or at least never exceeds to any great extent) what the customer configured for the OQ.

To begin with, consider that router 6 only needs to satisfy the tail drop threshold behavior of the OQ. When there is a guaranteed transmit rate for an OQ (in certain queueing models one can configure a transmit-rate for an OQ and this is a guaranteed rate which means the OQ is guaranteed to receive at least the configured transmit-rate as its service rate). This means the latency of all packets through this OQ never exceeds transmit-rate*buffer-size.

In previous approaches to OQ emulation with VOQs, the ingress PFE were limited to making decisions on admitting or dropping network packets based on their view of the VOQ depth, not the overall OQ depth. In some such approaches, each VOQ absorbs the burst of traffic up to its configured OQ buffer-size. But when multiple VOQs are active and absorbing bursts of this nature, what may happen is that the total buffer of OQ will look larger and the latency through the OQ will appear much larger than the configured OQ buffer-size. In some approaches, each ingress PFE could "scale' the maximum depth of their local VOQ by the time-averaged-bandwidth (TABW) such that the local VOQ maximum latency remained approximately constant, particularly under input loads which were changing slowly relative to the size/capacity of the VOQ buffer. Under burst conditions, however, this TABW scaling does not work properly, as each VOQ Manager is not aware of the (aggregate) OQ buffer depth.

To get the OQ behavior of a fixed configured buffer-size and latency, in one example approach, the ingress PFEs drop all the packets at the head of the VOQ that exceed the configured max latency through the OQ. This is very important. By dropping packets from the head of the VOQ, which have a residence time which exceeds the maximum latency configured for the OQ, this has the same externally-visible behavior as dropping packets at the tail of an (ideal) OQ, when the size of the OQ (as measured in latency) has reached its maximum threshold value.

From an implementation standpoint, what this means is that the ingress PFE, when it receives a GNT, should walk through the pages for the VOQ, drop the packets, pages or packet groups that exceed the configured max latency and send the packet, page or packet group that meets the maximum latency criteria. In one example approach, the VOQ Manager "walks" through the queue of packets, packet groups or pages, starting from the head of the queue, and examines the current resident-time of the packets (or packet groups or pages), and discard packets which exceed a latency threshold until finding a packet (or packet group or page) which has a latency which is below a threshold. In another example approach, the VOQ Manager "walks" through the queue of packets, packet groups or pages, starting from the head of the queue, and examines the current resident-time of the packets (or packet groups or pages), and discard packets which exceed a revised latency threshold (calculated as maximum latency minus a head drop duration (e.g., 10 microseconds)) until finding a packet (or packet group or page) which has a latency which is below the revised latency threshold.

This approach relies on sufficient processing speed in the VOQ Manager to walk the queue to find the acceptable packet (or page) in small amount of time in order to satisfy the Grant (by sending data) without undue delay. Too much delay could cause the (egress-side) OQ Buffer to run dry while waiting for VOQ Manager to send useful data in response to the Grant.

The concern of whether router 6 is unnecessarily holding up buffer in an oversubscribed scenario exists but, when there are cases where multiple ingress ports on a PFE oversubscribe an egress port, there is correspondingly a reduction in the fabric facing bandwidth used by the PFE and this means there is unused buffer available. In an always oversubscribed or steady state oversubscribed scenario, the buffer usage in a head drop design is larger than that of prior approaches by the oversubscription factor, but this does not matter. For example, in a PFE with 2×100 G ports, if both ingress ports send at port rate to a single egress port (output queue), in a head drop design as described above the total buffer usage for that queue will be 2*OQ_max_latency. For a OQ_max_latency of 100 us in a shallow-buffer PFE, the total buffer usage for each queue will be 200 microseconds while for a OQ_max_latency of 100 ms in a deeper buffer PFE, the total buffer usage for each queue will be 200 ms. In the case of the shallow-buffer PFE, the PFE had a total buffer of 100 us@200 G and this is same as 200 us@100 G and hence total pressure on the buffer usage is not increased on a long-term average basis.

In one example approach, the ingress PFEs are configured to implement a head drop technique as described above, and a tail drop technique. This may be done, for instance, to prevent any undesirable gross fate sharing of buffers across (virtual) output queues in the short term. From an implementation stand point, in one example approach, the tail drop threshold is configured to be several times larger than the head drop threshold (by, for instance, the oversubscription factor needed to emulate source port fairness in an ideal OQ).

In one example approach, in an OQ triggered head drop scheme, the Output Queue (GS—Grant Scheduler) makes the head drop decision for the VOQs and then informs every (active) VOQ contributing to that OQ to make the appropriate head drops. Every time a GNT is issued by GS the resident time of the VOQ (VIQ) (conceptually the head packet of the VOQ) is examined by Grant Scheduler 54 and, if a programmed maximum resident time threshold is crossed, then the Grant Scheduler 54 asks every contributing VOQ to do a head drop. In one such example approach, this head drop is for a fixed duration (e.g., programmable duration selected by a profile) by all the VOQs. This allows the Grant Scheduler to have control over every VOQ doing head drops roughly at the same time. And when every VOQ drops for a fixed time duration this also means the drops are approximately in the ratio of their arrival rates. Doing head drops for a fixed duration means the VOQ Manager looks at the head packet timestamp of that VOQ, and starts dropping packets from the VOQ until it sees a packet with a timestamp equal to head_pkt_timestamp+head_drop_duration. Effectively, a head drop duration worth of packets, packet groups or pages (@ arrival rate of the VOQ) are dropped from the head of the VOQ.

In one example approach, a single bit head drop indication is included in the GNT fabric header. In one such example approach, an unused/reserved bit is used for carrying this information from the egress PFE to the ingress PFE.

A visual representation of how the OQ triggered head drop scheme works is given below and may be helpful in visualizing and understanding the scheme.

Figure 8:
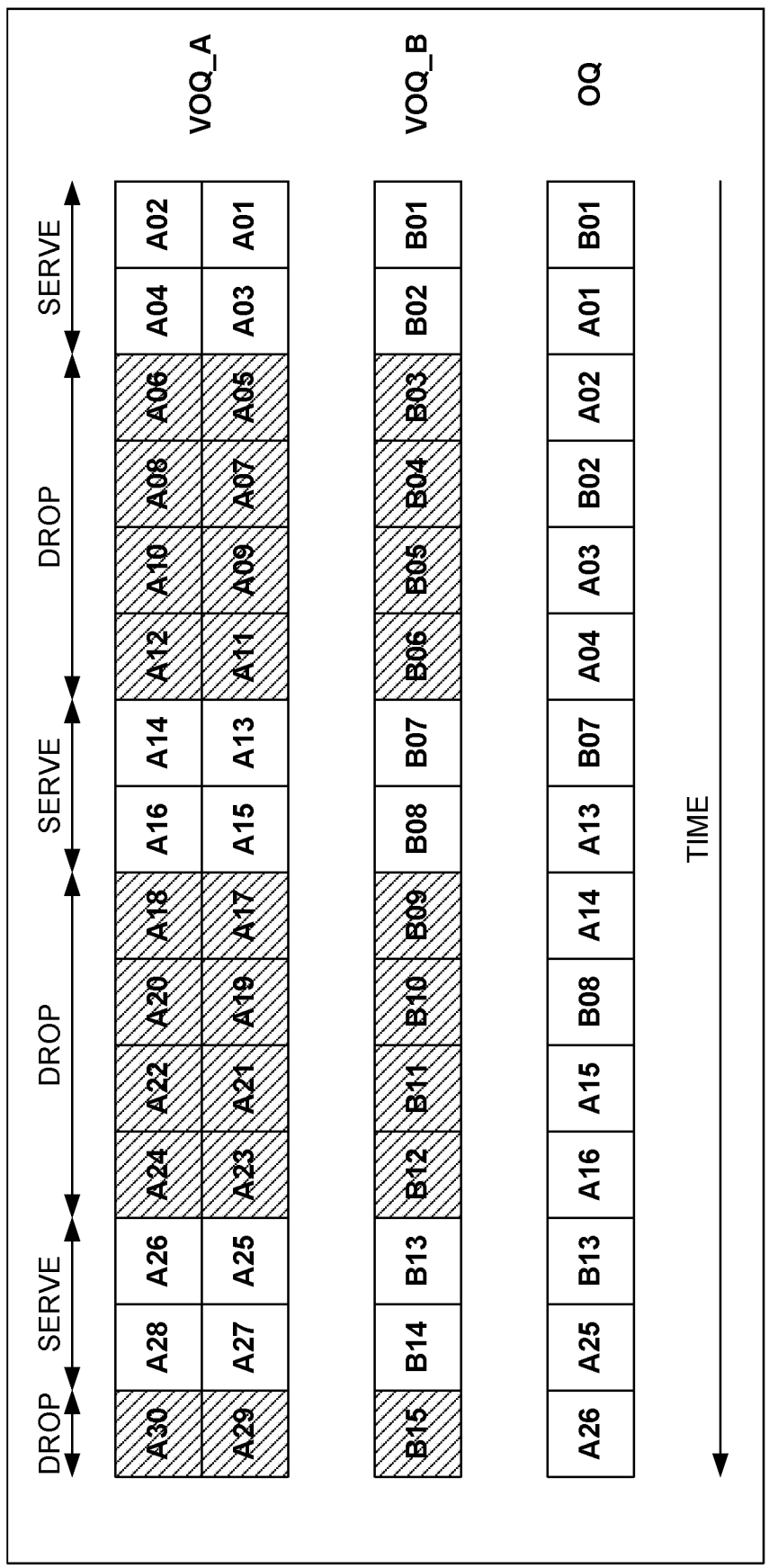
FIG. 8 illustrates an OQ router which is 3× oversubscribed and which has two contributing VOQs (VOQ_A and VOQ_B) with a 2:1 arrival rate ratio, in accordance with techniques of the present disclosure.

FIG. 8 illustrates an OQ router which is 3× oversubscribed, which has two contributing VOQs (VOQ_A and VOQ_B) with a 2:1 arrival rate ratio. In FIG. 8, the OQ is operating with a head drop duration of 4 units. For every time unit, since VOQ_A and VOQ_B have an arrival rate ratio of 2:1, for every VOQ_B packet unit there are two VOQ_A packet units arriving. The time axis is moving from right to left and the packets units arriving into VOQ_A and VOQ_B and departing from the OQ are shown in steady state with a continuous 3× oversubscription on the OQ.

The expectation is that, in certain Data Center applications, RED drops will not be used and instead router 6 employs DCTCP or similar algorithms leveraging Explicit Congestion Notification (ECN) marking. In one example approach, this will be achieved using egress PFE enhancements as described below.

Since, in these approaches, the timestamp of each packet has been carried over to the egress side, latency-based ECN marking can be implemented. The latency experienced by a packet can be used as a proxy for the congestion experienced by the packet. In one such approach, the egress PFE implements a probability curve to mark the packets as congested based on the latency seen by the packet relative to the max configured latency for the OQ, which is proportional to the configured buffer size for the OQ. Congestion sampling can be moved to the egress PFE as well.

In one example approach, the latency of packet/Max OQ latency provides the lookup point for the probability curve and, in some example approaches, the egress PFE sets a trap code along with marking the packet. In the trap code resolution table, each ingress PFE may configure to sample the packet and, if needed, to drop the packet, effectively giving a RED drop behavior.

Another technique for emulating an OQ router with VOQs will be discussed next. Earlier, Output Queued behavior in a switch had been defined as exhibiting the following two behaviors:

1. Packet admission: Packets arriving into the switch (on any ingress port) and destined towards an Output Queue (OQ) should be admitted into the Output Queue based on the current OQ occupancy level (i.e., the OQ occupancy based admission or drop determination should be based on the occupancy level of the current OQ)
2. Packet departure order: Packets arriving into the switch and admitted into an Output Queue (OQ) should leave the OQ in the order of arrival (OQ fifo order departure)

These parameters may be re-defined for Data Center applications by implementing packet marking as follows:

1. Packet tail drop and bounded max latency: Packets arriving into the switch (on any ingress port) and destined towards an Output Queue (OQ) should be admitted into the Output Queue based on the configured OQ buffer length (OQ tail drops and guarantees a bounded latency when there is a guaranteed transmit rate for the OQ)
2. Packet mark probability: Packets accepted into the OQ based on the OQ configured buffer length will have a mark probability based on the current OQ buffer length (OQ occupancy based mark probability)
3. Packet departure order: Packets arriving into the switch and admitted into an Output Queue (OQ) should leave the OQ in the order of arrival (OQ fifo order departure)

In one example approach, there are no red-drop behaviors, only ecn marking. When a router 6 has the above three behaviors occurring the same way as an Output Queued switch, the VOQ implementation is indistinguishable from an ideal Output Queued switch implementation.

Changes in the switch fabric will be discussed next. In one example approach, the switch fabric interface 160 of the ingress PFE 30A receives a timestamp with each page and needs to transport the timestamp over switch fabric 26. In one such example approach, a separate 16-byte messaging channel is used to transfer the timestamp as detailed below. In one example approach, encoding in the fabric header is used to indicate the presence of different types of messages in the 16B chunk carrying these messages.

In one example approach, the Timestamp message, when carried from ingress PFE to egress PFE on this separate channel, need not go through the reordering machinery at egress PFE. Hence the ingress PFE implementation does not consume a sequence number while generating a Timestamp message. (Sequence numbers are used to label packets transferred across the switch fabric.) Similarly, when the message is sent from the ingress PFE in a separate 96B DATA cell carrying only the message when a 16B chunk could not be added to the last cell of the page (when the last cell of the page was a 11 chunk or 176B cell), then the DATA cell generated to carry just the message will follow the same rules in terms of consuming a DATA sequence number (DCSN).

In the egress PFE, in one example approach, the fabric interface (FI) receives the messages on the new message channel, peels the messages apart and sends the TIMESTAMP messages to GS 172. The long-term average rate for TIMESTAMP messages to each GS instance is same as the page arrival rate, which is same as the GNT rate from each GS instance (⅓), but in some approaches, a burst FIFO is used to absorb short term bursts. Note that it is not fatal to drop Timestamp messages, either due to fabric errors or any other low frequency causes like a burst FIFO overflow.

In one example approach, GS 172 receives the timestamp messages and keeps the head packet, packet group or page arrival timestamp per VIQ. When a VIQ is newly installed (upon REQ arrival) the current time is assumed to be the arrival timestamp of the packet, packet group or page corresponding to that REQ. Subsequent updates are done to the VIQ using the timestamp information received in the DATA, which logically corresponds to the next packet, packet group or page in the VIQ. Note that, in some example approaches, delta-time is transported over fabric 26 and GS 172 reconstructs the arrival time (in its time domain) and stores the arrival time for each VIQ.

Every time a VIQ needs to be picked within an OQ, GS 172 picks the VIQ that has the maximum resident time. In one example approach, the resident time is computed by subtracting the arrival time from the current time. In one example approach, this is done by hierarchically comparing two or more VIQs at a time and the winner is again compared with other winners from its peers.

As noted above, for OQ triggered head drops, in one example approach, a programmable threshold for an OQ determines whether to snapshot all the active VIQs at that moment when the OQ crossing threshold is detected and, in some example approaches, all VOQs in that snapshot are asked to do a head drop in the subsequent GNTs sent to them. During this period, in one example approach, GS 172 picks from this snapshot vector instead of picking the max resident time VIQ.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. In a device having a plurality of ingress forwarding units connected through a switch fabric to a plurality of egress forwarding units, including a first egress forwarding unit, each egress forwarding unit including a scheduler and an output queue, and each ingress forwarding unit including a plurality of virtual output queues (VOQs), each VOQ associated with one output queue, a method comprising:

receiving, at the scheduler of the first egress forwarding unit, time of arrival information associated with each packet group of one or more network packets that is to be forwarded to the first egress forwarding unit, the time of arrival information indicating a time of arrival at one of the plurality of ingress forwarding units for the associated packet group;

determining, at the scheduler of the first egress forwarding unit and based on the time of arrival information associated with each packet group, a device resident time for each packet group stored at the head of one of the VOQs associated with the first egress forwarding unit;

discarding packet groups stored at the head of the VOQs if the packet groups have device resident times greater than a maximum resident time;

requesting, from one of the VOQs and based on the device resident times, the packet group with the longest device resident time; and receiving, at the output queue of the first egress forwarding unit, the packet group with the longest device resident time.

2. The method of claim 1, wherein determining a device resident time for each packet group includes converting, for each packet group, a time of arrival based on a clock in one of the plurality of ingress forwarding units into an approximate time of arrival based on a clock in the first egress forwarding unit.

3. The method of claim 1, wherein the method further comprises:

determining, based on the device resident times of one or more packet groups, congestion in the first egress forwarding unit; and discarding packet groups in one or more of the VOQs associated with the first egress forwarding unit when device resident times of one or more of the packet groups signal congestion in the first egress forwarding unit.

4. The method of claim 3, wherein discarding packet groups includes:

fetching the time of arrival information associated with a packet group at the head of one of the VOQs; and discarding the packet group if the time of arrival information associated with the packet group indicates a device resident time above the maximum resident time threshold.

5. The method of claim 3, wherein discarding packet groups includes:

fetching the time of arrival information associated with a packet group at the head of one of the VOQs; and selectively discarding the packet group if the time of arrival information associated with the packet group indicates a device resident time approaching the maximum resident time threshold.

6. The method of claim 3, wherein discarding packet groups includes:

fetching the time of arrival information associated with a packet group at the head of one of the VOQs; and selectively marking the packet group with congestion markings if the time of arrival information associated with the packet group indicates a device resident time approaching the maximum resident time threshold.

7. The method of claim 3, wherein discarding packet groups includes:

fetching the time of arrival information associated with a packet group at the head of one of the VOQs; and discarding the packet group if the time of arrival information associated with the packet group indicates a device resident time above a high drop threshold.

8. The method of claim 7, wherein discarding packet groups further includes:

fetching the time of arrival information associated with the next packet group in the VOQ; and discarding the next packet group if the time of arrival information associated with the next packet group indicates a device resident time above a low drop threshold.

9. The method of claim 1, wherein the method further comprises:

determining, based on the device resident times of one or more packet groups, congestion in the first egress forwarding unit;

capturing a snapshot of active VOQs associated with the first egress forwarding unit; and requesting that the VOQs in the snapshot of active VOQs begin to head drop packet groups.

10. The method of claim 9, wherein requesting includes setting a bit in a grant header indicating a head drop condition.

11. The method of claim 1, wherein each VOQ includes a buffer length, wherein the method further comprises:

monitoring, at the scheduler E of the first egress forwarding unit, an overall buffer length as a function of the buffer lengths of each of the VOQs associated with the first egress forwarding unit; and discarding packet groups in the VOQs associated with the first egress forwarding unit when the overall buffer length exceeds a threshold.

12. The method of claim 1, wherein each VOQ includes a buffer length, wherein the method further comprises:

monitoring, at the scheduler of the first egress forwarding unit, an overall buffer length as a function of the buffer lengths of each of the VOQs associated with the first egress forwarding unit; and selectively discarding, based on one or more congestion avoidance techniques, packet groups in the VOQs associated with the first egress forwarding unit when the overall buffer length approaches a threshold.

13. The method of claim 1, wherein each VOQ includes a buffer length, wherein the method further comprises:

monitoring, at the scheduler of the first egress forwarding unit, an overall buffer length as a function of the buffer lengths of each of the VOQs associated with the first egress forwarding unit; and selectively marking packet groups in the VOQs associated with the first egress forwarding unit with congestion markings when the overall buffer length approaches a threshold.

14. The method of claim 1, wherein the method further comprises:

determining, based on the device resident times of one or more packet groups, congestion in the output queue of the first egress forwarding unit; and signaling the impending congestion via Explicit Congestion Notification (ECN) generated by the first egress forwarding unit.

15. The method of claim 1, wherein the method further comprises:

determining, based on the device resident times of one or more packet groups, congestion in the output queue of the first egress forwarding unit; and signaling the impending congestion via Explicit Congestion Notification (ECN) generated by the VOQs associated with the first egress forwarding unit.

16. A non-transitory computer-readable storage medium comprising instructions for causing one or more programmable processors to:

receive time of arrival information associated with one or more network packets to be forwarded from virtual output queues (VOQs) of one or more ingress forwarding units, the VOQs associated with a first egress forwarding unit, the time of arrival information corresponding to an approximate time of arrival of the network packet at the ingress forwarding unit of the VOQ in which the network packet is stored;

determine, based on the time of arrival information, a device resident time for one or more of the network packets stored at the head of the VOQs associated with the first egress forwarding unit;

discard the network packets stored at the head of the VOQs if the network packets have device resident times greater than a maximum resident time;

request, from one of the VOQs associated with the first egress forwarding unit and based on the device resident times, the network packet with the longest device resident time; and receive, at the output queue of the egress PFE of the first egress forwarding unit, the network packet with the longest device resident time.

17. In a device having ingress packet forwarding engines (PFEs) and egress PFEs, wherein each ingress PFE includes a virtual output queue (VOQ) associated with an output buffer of the egress PFE, a method comprising:

determining, at a scheduler of the egress PFE, a device resident time for each network packet stored at the head of one of the VOQs associated with the output buffer of the egress PFE, wherein determining includes receiving, from each ingress PFE, information related to time of arrival, at the ingress PFE, of network packets stored in the VOQ of the ingress PFE;

determining a longest device resident time from the device resident times of the network packets stored at the head of the VOQs associated with the output buffer of the egress PFE;

if the longest device resident time is greater than a maximum device resident time, discarding one or more network packets stored at the head of one or more of the VOQs associated with the output buffer of the egress PFE; and requesting, at the scheduler of the egress PFE, that the network packet with the longest device resident time be transmitted from the VOQ in which the network packet is stored to the output buffer of the egress PFE.

18. The method of claim 17, wherein discarding one or more network packets includes discarding the network packet with the longest device resident time.

19. The method of claim 17, wherein the maximum device resident time is programmable.

20. The method of claim 17, wherein discarding one or more network packets includes discarding the network packet with the longest device resident time and discarding network packets with device resident times within a predefined interval of time of the maximum device resident time.

21. The method of claim 20, wherein the maximum device resident time and the predefined interval are programmable.

22. The method of claim 17, wherein the method further comprises:

determining impending congestion via device resident times stored in the egress PFE and signaling the impending congestion at the egress PFE via Explicit Congestion Notification (ECN).

23. A non-transitory computer-readable storage medium comprising instructions for causing one or more programmable processors to:

determine a device resident time for each network packet stored in one of the virtual output queues (VOQs) associated with the output queue of the egress forwarding unit, wherein determining includes receiving, from each ingress forwarding unit, information related to time of arrival, at the ingress forwarding unit, of network packets stored in the VOQ of the ingress forwarding unit;

discard the network packets stored at the head of the VOQs if the network packets have device resident times greater than a maximum resident time;

determine a longest device resident time from the device resident times of the network packets stored at the head of the VOQs; and request, at a scheduler of the egress forwarding unit, that the network packet with the longest device resident time be transmitted from the VOQ in which the network packet is stored to the output buffer of the egress forwarding unit.

24. A network device comprising:
a switch fabric; and
a plurality of forwarding units, each forwarding unit connected to the switch fabric, wherein two or more ingress ones of the forwarding units forward network packets to an egress one of the forwarding units via the switch fabric, the egress forwarding unit including a scheduler and an output queue attached to a network interface, each ingress forwarding unit including a Virtual Output Queue (VOQ) connected to the output queue and a VOQ manager for the VOQ, each VOQ comprising a logical queue associated with the output queue of the egress forwarding unit, each VOQ manager determining when to discard network packets stored in its VOQ, wherein the scheduler receives time of arrival information for network packets stored at the head of the VOQs, determines, based on the time of arrival information for each network packet, a device resident time for the network packets stored at the head of the VOQs, determines if the network packets stored at the head of the VOQs have device resident times greater than a maximum resident time and conveys that information to the VOQ manager of one or more of the VOQs connected to the output queue;

wherein the VOQ managers that receive the information discard the network packet at the head of their associated VOQ, and wherein the scheduler requests, from one of the VOQs and based on the device resident times, the network packet with the longest device resident time.

25. The network device of claim 24, wherein the ingress forwarding unit receives a first packet of a network packet flow via its network interface, the network device further comprising a lookup module connected to one or more of the ingress forwarding units, the lookup module determining a forwarding next hop for the first packet of the network packet flow through the switch fabric to the egress forwarding unit, wherein the VOQ manager discards the first packet if enqueuing the first packet to the VOQ would exceed the buffer size of an overall VOQ buffer length.

26. The network device of claim 24, wherein the ingress forwarding unit receives a first packet of a network packet flow via its network interface, the network device further comprising a lookup module connected to one or more of the ingress forwarding units, the lookup module determining a forwarding next hop for the first packet of the network packet flow through the switch fabric to the egress forwarding unit.

27. The network device of claim 26,
wherein each VOQ manager, when notified by the scheduler that one or more network packets in the VOQs connected to the output queue has a resident time greater than a maximum resident time, discards packets at the head of its VOQ until the resident times of packets remaining in its VOQ are below a pre-defined threshold.

* * * * *